(12) United States Patent
Adamek et al.

(10) Patent No.: US 11,554,338 B2
(45) Date of Patent: Jan. 17, 2023

(54) FILTER ELEMENTS, AIR CLEANER ASSEMBLIES, AND METHODS OF USE AND ASSEMBLY

(71) Applicant: Donaldson Company, Inc., Minneapolis, MN (US)

(72) Inventors: Daniel E. Adamek, Bloomington, MN (US); Benny K. Nelson, Bloomington, MN (US); William Vanaudenhove, Diest (BE); Antoine Decugniere, Woluwe Saint-Pierre (BE)

(73) Assignee: Donaldson Company, Inc., Bloomington, MN (US)

( * ) Notice: Subject to any disclaimer, the term of this patent is extended or adjusted under 35 U.S.C. 154(b) by 61 days.

(21) Appl. No.: 16/465,874

(22) PCT Filed: Dec. 1, 2017

(86) PCT No.: PCT/US2017/064260
§ 371 (c)(1),
(2) Date: May 31, 2019

(87) PCT Pub. No.: WO2018/102712
PCT Pub. Date: Jun. 7, 2018

(65) Prior Publication Data
US 2020/0038795 A1 Feb. 6, 2020

Related U.S. Application Data

(60) Provisional application No. 62/463,263, filed on Feb. 24, 2017, provisional application No. 62/428,913, filed on Dec. 1, 2016.

(51) Int. Cl.
*B01D 46/24* (2006.01)
*B01D 50/00* (2022.01)
(Continued)

(52) U.S. Cl.
CPC ......... *B01D 46/2414* (2013.01); *B01D 45/16* (2013.01); *B01D 50/20* (2022.01); *B01D 2271/027* (2013.01); *B01D 2279/60* (2013.01)

(58) Field of Classification Search
CPC .. B01D 46/2414; B01D 45/16; B01D 50/002; B01D 2271/027; B01D 2279/60
(Continued)

(56) References Cited

U.S. PATENT DOCUMENTS 4,128,251 A 12/1978 Gaither et al.
4,410,427 A 10/1983 Wydeven
(Continued)

FOREIGN PATENT DOCUMENTS

CN 201179395 Y 1/2009
CN 204403359 6/2015
(Continued)

OTHER PUBLICATIONS

International Search Report and Written Opinion for Application No. PCT/US2017/064260 dated Jul. 10, 2018.
(Continued)

*Primary Examiner* — Robert A Hopkins
*Assistant Examiner* — Qianping He
(74) *Attorney, Agent, or Firm* — Merchant & Gould P.C.

(57) ABSTRACT

Air cleaner assemblies, components therefor, and features thereof are described. Also described are methods of assembly and use. In depicted examples, the air cleaner assemblies and components optionally use advantageous housing seal features. Methods of assembly and use are described.

6 Claims, 24 Drawing Sheets

(51) Int. Cl.
*B01D 45/16* (2006.01)
*B01D 50/20* (2022.01)

(58) Field of Classification Search
USPC ......................................................... 55/502
See application file for complete search history.

(56) References Cited

U.S. PATENT DOCUMENTS

| | | |
|---|---|---|
| 4,426,095 A | 1/1984 | Buttner |
| 4,589,983 A | 5/1986 | Wydevan |
| 4,719,012 A | 1/1988 | Groezinger et al. |
| 4,720,292 A | 1/1988 | Engel et al. |
| 4,734,195 A | 3/1988 | Lhuillier et al. |
| 4,878,930 A * | 11/1989 | Manniso ............ B01D 46/0068 55/493 |
| 4,925,561 A | 5/1990 | Ishii et al. |
| 4,974,881 A | 12/1990 | Engel et al. |
| 5,049,326 A | 9/1991 | Matsumoto et al. |
| D326,706 S | 6/1992 | Karlsson |
| 5,464,337 A | 11/1995 | Bernardon et al. |
| 5,487,767 A | 1/1996 | Brown |
| 5,556,440 A | 9/1996 | Mullins et al. |
| 5,562,825 A | 10/1996 | Yamada et al. |
| 5,613,992 A | 3/1997 | Engel |
| 5,730,769 A | 3/1998 | Dungs et al. |
| 5,755,844 A * | 5/1998 | Arai ...................... B01D 46/24 55/498 |
| 5,775,844 A | 5/1998 | Arai et al. |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A | 10/1998 | Gillingham et al. |
| 5,893,937 A | 4/1999 | Moessinger |
| 5,895,574 A | 4/1999 | Friedmann et al. |
| 5,902,364 A | 5/1999 | Tokar et al. |
| D417,268 S | 11/1999 | Gillingham |
| 6,039,778 A | 3/2000 | Coulonvaux |
| D425,189 S | 5/2000 | Gillingham et al. |
| D428,128 S | 7/2000 | Gillingham et al. |
| 6,132,608 A | 10/2000 | Sale et al. |
| 6,179,890 B1 | 1/2001 | Ramos et al. |
| D437,401 S | 2/2001 | Ramos et al. |
| D437,402 S | 2/2001 | Gieseke et al. |
| 6,190,432 B1 | 2/2001 | Gieseke et al. |
| 6,210,469 B1 | 4/2001 | Tokar |
| 6,221,122 B1 | 4/2001 | Gieseke et al. |
| RE37,163 E | 5/2001 | Oussoren et al. |
| 6,235,195 B1 | 5/2001 | Tokar |
| D444,219 S | 6/2001 | Gieseke et al. |
| D447,549 S | 9/2001 | Gieseke et al. |
| D450,827 S | 11/2001 | Gieseke et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,350,296 B1 | 2/2002 | Warner |
| 6,368,374 B1 | 4/2002 | Tokar et al. |
| 6,383,244 B1 | 5/2002 | Wake et al. |
| 6,387,162 B1 | 5/2002 | Kosmider et al. |
| D460,169 S | 7/2002 | Anderson et al. |
| D461,003 S | 7/2002 | Gieseke et al. |
| 6,416,561 B1 | 7/2002 | Kallsen et al. |
| 6,416,605 B1 | 7/2002 | Golden |
| 6,419,718 B1 | 7/2002 | Klug et al. |
| 6,447,567 B1 | 9/2002 | Ehrenberg |
| D464,129 S | 10/2002 | Xu et al. |
| 6,482,247 B2 | 11/2002 | Jaroszczyk et al. |
| 6,517,598 B2 | 2/2003 | Anderson et al. |
| D471,623 S | 3/2003 | Gieseke et al. |
| D473,637 S | 4/2003 | Golden |
| 6,572,667 B1 | 6/2003 | Greif et al. |
| D477,659 S | 7/2003 | Gieseke et al. |
| 6,585,894 B1 | 7/2003 | Gebert et al. |
| 6,599,342 B2 | 7/2003 | Andress et al. |
| 6,610,126 B2 | 8/2003 | Xu et al. |
| D481,101 S | 10/2003 | Boehrs et al. |
| 6,638,332 B1 | 10/2003 | Schmitz et al. |
| 6,652,614 B2 | 11/2003 | Gieseke et al. |
| D483,459 S | 12/2003 | DeWit et al. |
| D484,584 S | 12/2003 | Anderson et al. |
| 6,673,136 B2 | 1/2004 | Gillingham et al. |
| 6,706,087 B1 | 3/2004 | Gebler et al. |
| 6,743,317 B2 | 6/2004 | Wydeven |
| D497,202 S | 10/2004 | Carter et al. |
| 6,852,141 B2 | 2/2005 | Bishop et al. |
| D506,539 S | 6/2005 | Bishop et al. |
| 6,936,084 B2 | 8/2005 | Schlensker et al. |
| 6,966,940 B2 | 11/2005 | Krisko et al. |
| 7,004,986 B2 | 2/2006 | Kopec et al. |
| D520,619 S | 5/2006 | Kuempel et al. |
| 7,070,642 B2 | 7/2006 | Scott et al. |
| 7,083,661 B2 | 8/2006 | Hasegawa et al. |
| 7,090,708 B2 | 8/2006 | Winter et al. |
| 7,115,156 B2 | 10/2006 | Schaerlund et al. |
| 7,247,183 B2 | 7/2007 | Connor et al. |
| 7,282,075 B2 | 10/2007 | Sporre et al. |
| 7,329,326 B2 | 2/2008 | Wagner et al. |
| 7,351,270 B2 | 4/2008 | Engelland et al. |
| 7,364,601 B2 | 4/2008 | Xu et al. |
| 7,396,375 B2 | 7/2008 | Nepsund et al. |
| 7,396,376 B2 | 7/2008 | Schrage et al. |
| 7,455,707 B2 | 11/2008 | Engel et al. |
| 7,488,365 B2 | 2/2009 | Golden et al. |
| 7,520,913 B2 | 4/2009 | Mills et al. |
| 7,524,349 B2 | 4/2009 | Schrage et al. |
| 7,537,631 B2 | 5/2009 | Scott et al. |
| 7,569,090 B2 | 8/2009 | Nelson |
| D600,790 S | 9/2009 | Nelson et al. |
| 7,625,419 B2 | 12/2009 | Nelson et al. |
| 7,655,074 B2 | 2/2010 | Nepsund et al. |
| 7,658,777 B2 | 2/2010 | Kopec et al. |
| 7,674,308 B2 | 3/2010 | Krisko et al. |
| 7,682,416 B2 | 3/2010 | Engelland et al. |
| 7,713,321 B2 | 5/2010 | Kuempel et al. |
| RE42,174 E | 3/2011 | Gunderson et al. |
| D635,233 S | 3/2011 | Nelson et al. |
| 7,905,936 B2 | 3/2011 | Coulonvaux et al. |
| 7,959,703 B2 | 6/2011 | Merritt et al. |
| 7,967,886 B2 | 6/2011 | Schrage et al. |
| 7,972,404 B2 | 7/2011 | Kuempel et al. |
| 7,972,405 B2 | 7/2011 | Engelland et al. |
| 7,981,183 B2 | 7/2011 | Nepsund et al. |
| 7,997,425 B2 | 8/2011 | Golden et al. |
| 8,016,903 B2 | 9/2011 | Nelson et al. |
| 8,034,145 B2 | 10/2011 | Boehrs et al. |
| 8,038,756 B2 | 10/2011 | Iddings et al. |
| 8,048,188 B2 | 11/2011 | Widerski et al. |
| 8,066,791 B2 | 11/2011 | Baseotto et al. |
| 8,097,154 B2 | 1/2012 | Dworatzek et al. |
| 8,128,724 B2 | 3/2012 | Mills et al. |
| 8,142,533 B2 | 3/2012 | Gillenberg et al. |
| 8,147,576 B2 | 4/2012 | Gillenberg et al. |
| 8,152,876 B2 | 4/2012 | Gillenberg et al. |
| 8,163,056 B2 | 4/2012 | Coulonvaux et al. |
| 8,167,142 B2 | 5/2012 | Hacker |
| 8,182,569 B2 | 5/2012 | Casey et al. |
| 8,216,334 B2 | 7/2012 | Nelson et al. |
| 8,216,335 B2 | 7/2012 | Scott et al. |
| 8,226,786 B2 | 7/2012 | Schrage et al. |
| 8,241,383 B2 | 8/2012 | Schrage et al. |
| 8,268,032 B2 | 9/2012 | Eyers et al. |
| 8,273,143 B2 | 9/2012 | Coulonvaux et al. |
| 8,277,532 B2 | 10/2012 | Reichter et al. |
| 8,287,612 B2 | 10/2012 | Gillenberg et al. |
| 8,292,983 B2 | 10/2012 | Reichter et al. |
| 8,292,984 B2 | 10/2012 | Baseotto et al. |
| 8,328,897 B2 | 12/2012 | Nelson et al. |
| 8,357,219 B2 | 1/2013 | Boehrs et al. |
| 8,361,181 B2 | 1/2013 | Osendorf et al. |
| 8,382,876 B2 | 2/2013 | Widerski et al. |
| 8,404,029 B2 | 3/2013 | Lundgren et al. |
| 8,409,316 B2 | 4/2013 | Nelson et al. |

(56) References Cited

U.S. PATENT DOCUMENTS

| | | | |
|---|---|---|---|
| 8,414,675 B2 | 4/2013 | Iddings et al. |
| 8,444,736 B2 | 5/2013 | Dworatzek et al. |
| 8,479,924 B2 | 7/2013 | Mbadinga-Mouanda et al. |
| 8,480,778 B2 | 7/2013 | Baseotto et al. |
| 8,496,723 B2 | 7/2013 | Reichter et al. |
| 8,499,749 B2 | 8/2013 | Mosset et al. |
| 8,545,588 B2 | 10/2013 | Iddings et al. |
| 8,557,007 B2 | 10/2013 | Read |
| 8,591,621 B2 | 11/2013 | Ruhland et al. |
| 8,663,355 B2 | 3/2014 | Nelson et al. |
| 8,714,142 B2 | 5/2014 | Jacob et al. |
| 8,741,017 B2 | 6/2014 | Nelson |
| 8,747,512 B2 | 6/2014 | Mills et al. |
| 8,758,467 B2 | 6/2014 | Lundgren et al. |
| 8,808,417 B2 | 8/2014 | Engelland et al. |
| 8,814,973 B2 | 8/2014 | Baseotto et al. |
| 8,840,699 B2 | 9/2014 | Bruce et al. |
| 8,864,866 B2 | 10/2014 | Osendorf et al. |
| 8,906,128 B2 | 12/2014 | Reichter et al. |
| 8,916,044 B2 | 12/2014 | Rapin |
| 8,920,530 B2 | 12/2014 | Ruhland et al. |
| 8,945,268 B2 | 2/2015 | Nelson et al. |
| 9,120,047 B2 | 9/2015 | Boehrs et al. |
| 9,180,399 B2 | 11/2015 | Reichter et al. |
| 9,217,399 B2 | 12/2015 | Engelland et al. |
| 9,254,457 B2 | 2/2016 | Kaufmann et al. |
| 9,308,482 B2 | 4/2016 | Kaiser |
| 9,320,997 B2 | 4/2016 | Campbell et al. |
| 9,346,001 B2 | 5/2016 | Kato et al. |
| 9,387,425 B2 | 7/2016 | Osendorf et al. |
| 9,399,972 B2 | 7/2016 | Boehrs et al. |
| 9,446,339 B2 | 9/2016 | Rieger et al. |
| 9,463,404 B2 | 10/2016 | Rieger et al. |
| 9,527,023 B2 | 12/2016 | Reichter et al. |
| 9,579,596 B2 | 2/2017 | Rieger et al. |
| 9,610,529 B2 | 4/2017 | Mills et al. |
| 9,636,615 B2 | 5/2017 | Osendorf et al. |
| 9,718,019 B2 | 8/2017 | Baseotto et al. |
| 10,029,198 B2 | 7/2018 | Adamek et al. |
| 10,046,260 B2 | 8/2018 | Campbell et al. |
| 10,245,541 B2 | 4/2019 | Kaufmann et al. |
| 10,258,913 B2 | 4/2019 | Osendorf et al. |
| 10,279,302 B2 | 5/2019 | Mils et al. |
| 2002/0096247 A1 | 7/2002 | Wydeven |
| 2003/0146149 A1 | 8/2003 | Binder et al. |
| 2004/0035097 A1 | 2/2004 | Schlensker et al. |
| 2004/0187689 A1 | 9/2004 | Sporre et al. |
| 2005/0130508 A1 | 6/2005 | Yeh |
| 2005/0166561 A1 | 8/2005 | Schrage et al. |
| 2005/0193695 A1* | 9/2005 | Holmes ............ F02M 35/0203 |
| | | 55/482 |
| 2005/0252848 A1 | 11/2005 | Miller |
| 2006/0102549 A1 | 5/2006 | Wright |
| 2006/0174598 A1 | 8/2006 | Mills et al. |
| 2007/0039296 A1 | 2/2007 | Schrage et al. |
| 2007/0235384 A1 | 10/2007 | Oku et al. |
| 2008/0041026 A1 | 2/2008 | Engel et al. |
| 2008/0110142 A1 | 5/2008 | Nelson et al. |
| 2008/0115758 A1 | 5/2008 | Engelland et al. |
| 2008/0190082 A1 | 8/2008 | Scott et al. |
| 2008/0282890 A1 | 11/2008 | Rocklitz et al. |
| 2008/0307759 A1 | 12/2008 | Reichter et al. |
| 2009/0064646 A1 | 3/2009 | Reichter et al. |
| 2009/0094951 A1 | 4/2009 | Baseotto et al. |
| 2009/0100813 A1 | 4/2009 | Iddings et al. |
| 2009/0127211 A1 | 5/2009 | Rocklitz et al. |
| 2009/0151311 A1 | 6/2009 | Reichter et al. |
| 2009/0211450 A1 | 8/2009 | Mosset et al. |
| 2009/0217632 A1 | 9/2009 | Coulonvaux et al. |
| 2009/0301045 A1 | 12/2009 | Nelson et al. |
| 2010/0032365 A1 | 2/2010 | Moe et al. |
| 2010/0043366 A1 | 2/2010 | Boehrs et al. |
| 2010/0044295 A1 | 2/2010 | Honermann et al. |
| 2010/0064646 A1 | 3/2010 | Smith et al. |
| 2010/0146917 A1 | 6/2010 | Coulonvaux et al. |
| 2010/0146919 A1 | 6/2010 | Nelson et al. |
| 2010/0146920 A1 | 6/2010 | Iddings et al. |
| 2010/0186353 A1 | 7/2010 | Ackermann et al. |
| 2010/0258493 A1 | 10/2010 | Kindkeppel et al. |
| 2010/0263339 A1 | 10/2010 | Steins et al. |
| 2010/0293906 A1 | 11/2010 | Flagstad et al. |
| 2011/0017657 A1 | 1/2011 | Jokschas et al. |
| 2011/0094197 A1 | 4/2011 | Ruhland et al. |
| 2011/0099960 A1 | 5/2011 | Menssen et al. |
| 2011/0173937 A1 | 7/2011 | Nelson |
| 2011/0232244 A1 | 9/2011 | Schrage et al. |
| 2011/0247582 A1 | 10/2011 | Blossey et al. |
| 2011/0308212 A1 | 12/2011 | Ruhland et al. |
| 2013/0263744 A1 | 10/2013 | Osendorf et al. |
| 2014/0059986 A1 | 3/2014 | Kaufmann et al. |
| 2014/0102058 A1 | 4/2014 | Kaufmann et al. |
| 2014/0165834 A1 | 6/2014 | Kaufmann et al. |
| 2014/0208702 A1 | 7/2014 | Lundgren et al. |
| 2014/0208705 A1 | 7/2014 | Krull |
| 2014/0215982 A1 | 8/2014 | Wood et al. |
| 2014/0230387 A1* | 8/2014 | Kawabe ............ B01D 46/0024 |
| | | 55/482 |
| 2014/0250843 A1 | 9/2014 | Krull et al. |
| 2014/0251895 A1 | 9/2014 | Wagner |
| 2014/0260143 A1 | 9/2014 | Kaiser |
| 2014/0290194 A1 | 10/2014 | Muenkel et al. |
| 2014/0318092 A1 | 10/2014 | Rieger et al. |
| 2015/0013289 A1 | 1/2015 | Hasenfratz et al. |
| 2015/0101298 A1 | 4/2015 | Osendorf et al. |
| 2015/0101299 A1 | 4/2015 | Osendorf et al. |
| 2015/0292448 A1 | 10/2015 | Campbell et al. |
| 2016/0375391 A1 | 12/2016 | Adametk et al. |
| 2017/0001134 A1 | 1/2017 | Rieger et al. |
| 2017/0036150 A1 | 2/2017 | Osendorf et al. |
| 2017/0232374 A1 | 8/2017 | Osendorf et al. |
| 2017/0246571 A1 | 8/2017 | Adamek et al. |
| 2017/0326492 A1 | 11/2017 | Baseotto et al. |
| 2018/0361292 A1 | 12/2018 | Adamek et al. |
| 2019/0046915 A1 | 2/2019 | Gieseke et al. |
| 2019/0111374 A1 | 4/2019 | Burton et al. |

FOREIGN PATENT DOCUMENTS

| | | |
|---|---|---|
| DE | 295 17 919 U1 | 12/1995 |
| DE | 199 35 297 A1 | 2/2001 |
| DE | 102005015918 A1 | 10/2005 |
| DE | 20 2006 014 784 U1 | 3/2008 |
| DE | 20 2007 018 072 U1 | 6/2009 |
| DE | 20 2008 017 059 U1 | 6/2010 |
| EP | 0 676 228 A1 | 10/1995 |
| EP | 0 793 041 A1 | 9/1997 |
| EP | 0889229 A2 | 1/1999 |
| EP | 1 106 232 A1 | 6/2001 |
| EP | 2 140 922 A2 | 1/2010 |
| EP | 2 477 718 B1 | 3/2014 |
| EP | 2 982 427 A1 | 2/2016 |
| EP | 2 742 986 B1 | 4/2018 |
| FR | 2 214 505 A1 | 8/1974 |
| JP | 8-144738 A | 6/1996 |
| JP | 2000-274319 A | 10/2000 |
| JP | 2004-136203 A | 5/2004 |
| JP | 2007-205261 A | 8/2007 |
| JP | 2008-540088 A | 11/2008 |
| JP | 2010-24978 A | 2/2010 |
| WO | 97/40918 A1 | 11/1997 |
| WO | 00/01464 A2 | 1/2000 |
| WO | 00/50149 A1 | 8/2000 |
| WO | 00/50152 A1 | 8/2000 |
| WO | 03/047722 A2 | 6/2003 |
| WO | 03/084641 A2 | 10/2003 |
| WO | 2004/007054 A1 | 1/2004 |
| WO | 2004/071616 A2 | 8/2004 |
| WO | 2004/082795 A2 | 9/2004 |
| WO | 2005/063361 A1 | 7/2005 |
| WO | 2005/077487 A1 | 8/2005 |
| WO | 2005/079954 A1 | 9/2005 |
| WO | 2005/094655 A2 | 10/2005 |
| WO | 2006/026241 A1 | 3/2006 |
| WO | 2007/009040 A1 | 1/2007 |

(56) References Cited

FOREIGN PATENT DOCUMENTS

| | | |
|---|---|---|
| WO | 2007/044677 A1 | 4/2007 |
| WO | 2007/053411 A2 | 5/2007 |
| WO | 2008/045326 A2 | 4/2008 |
| WO | 2006/084094 A2 | 8/2008 |
| WO | 2008/118939 A1 | 10/2008 |
| WO | 2008/157251 A2 | 12/2008 |
| WO | 2009/014986 A1 | 1/2009 |
| WO | 2009/014988 A1 | 1/2009 |
| WO | 2009/047196 A1 | 4/2009 |
| WO | 2009061998 | 5/2009 |
| WO | 2011146474 | 11/2011 |
| WO | 2012/116314 A1 | 8/2012 |
| WO | 2013/003762 A2 | 1/2013 |
| WO | 2013/010818 A1 | 1/2013 |
| WO | WO-2013010818 A1 * | 1/2013 ......... B01D 46/0005 |
| WO | 2013/063497 A2 | 5/2013 |
| WO | 2014/194275 A2 | 12/2014 |
| WO | 2014/197698 A2 | 12/2014 |
| WO | 2014/210541 A1 | 12/2014 |
| WO | 2015/010085 A2 | 1/2015 |
| WO | 2016/034657 A1 | 3/2016 |
| WO | 2016/057815 A1 | 4/2016 |
| WO | 2016/077377 A1 | 5/2016 |
| WO | 2016/105560 A2 | 6/2016 |
| WO | 2017/139673 A1 | 8/2017 |
| WO | 2019/046614 A1 | 3/2019 |

OTHER PUBLICATIONS

Office Action Corresponding to 201780072759.2 dated Dec. 29, 2020.

* cited by examiner

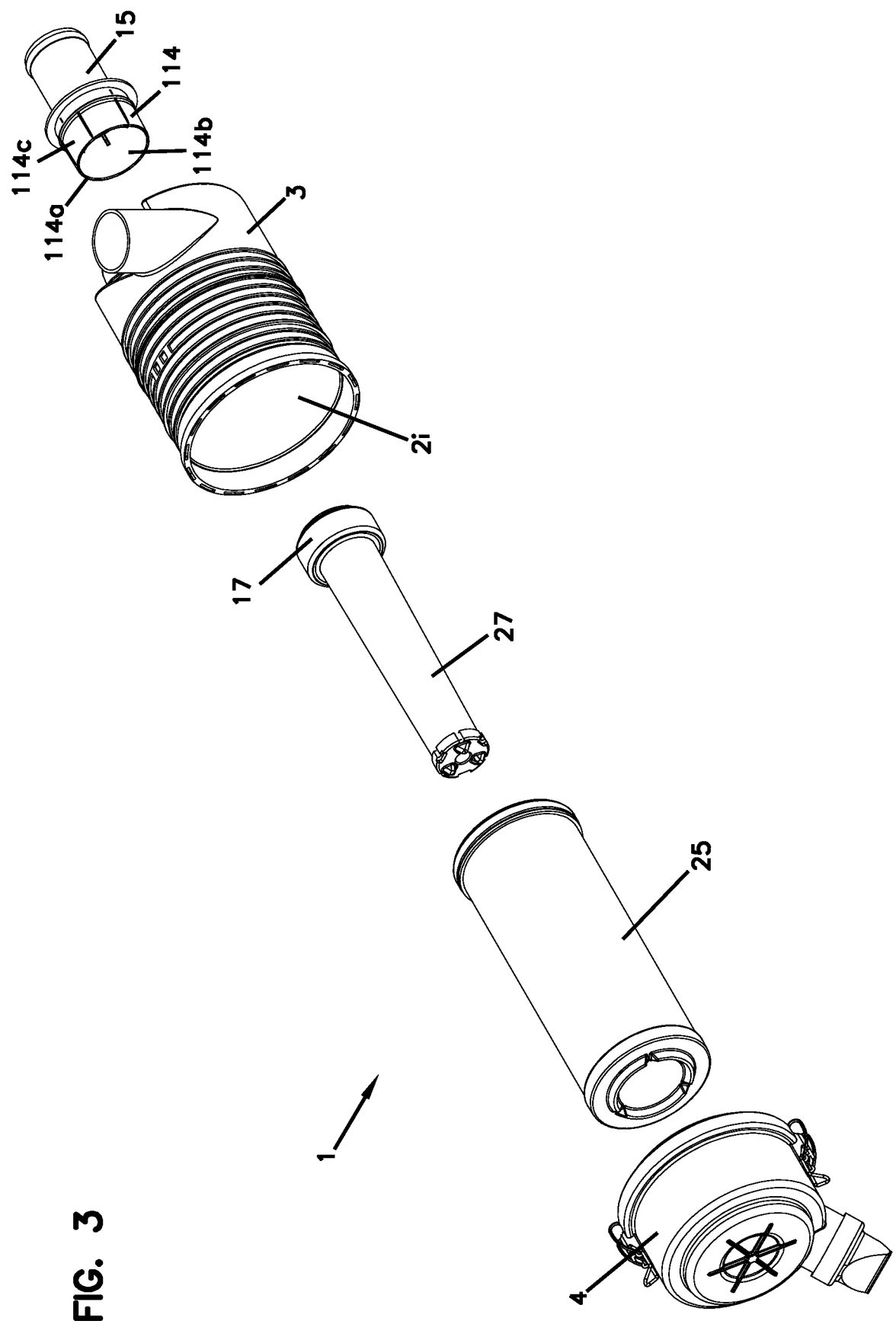

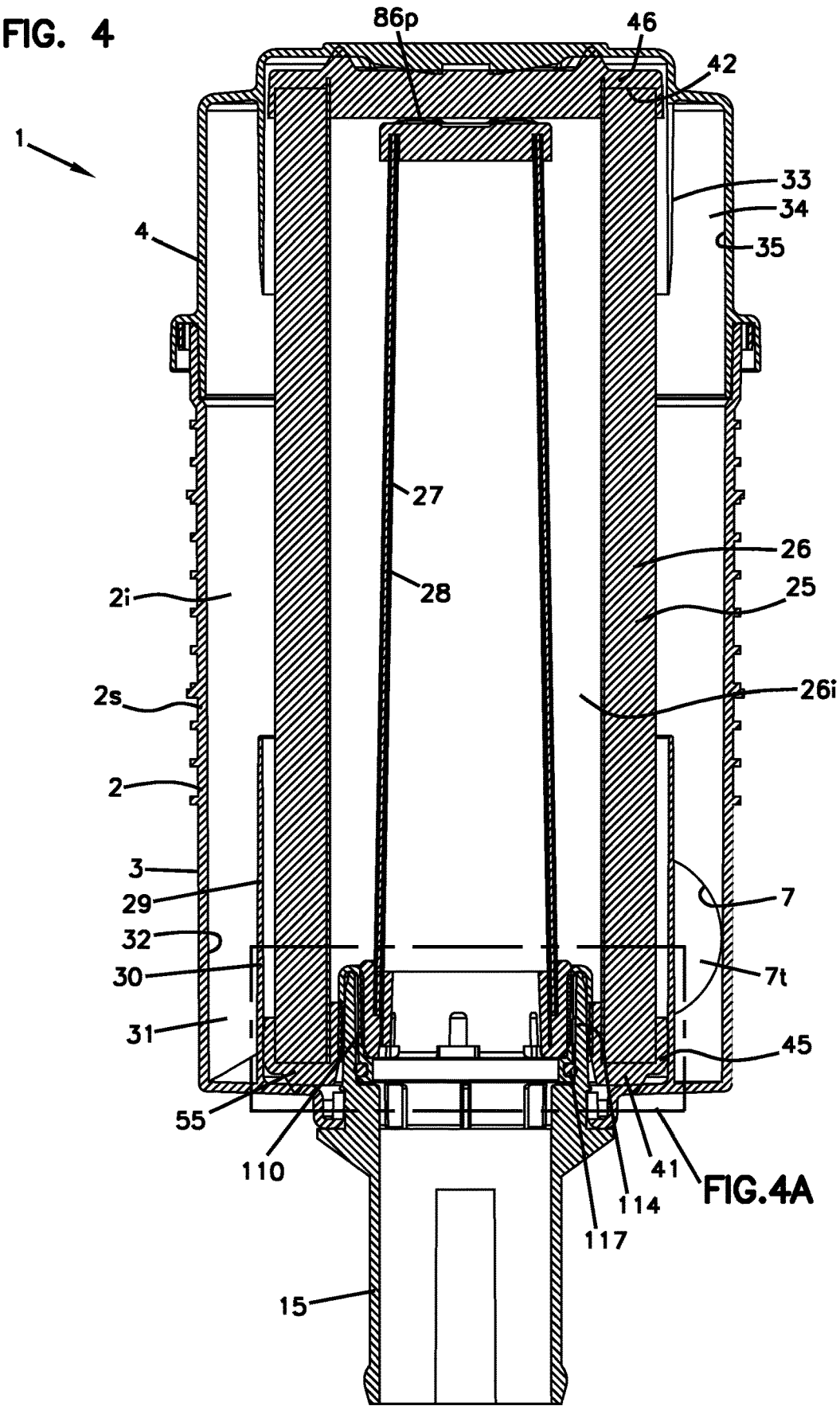

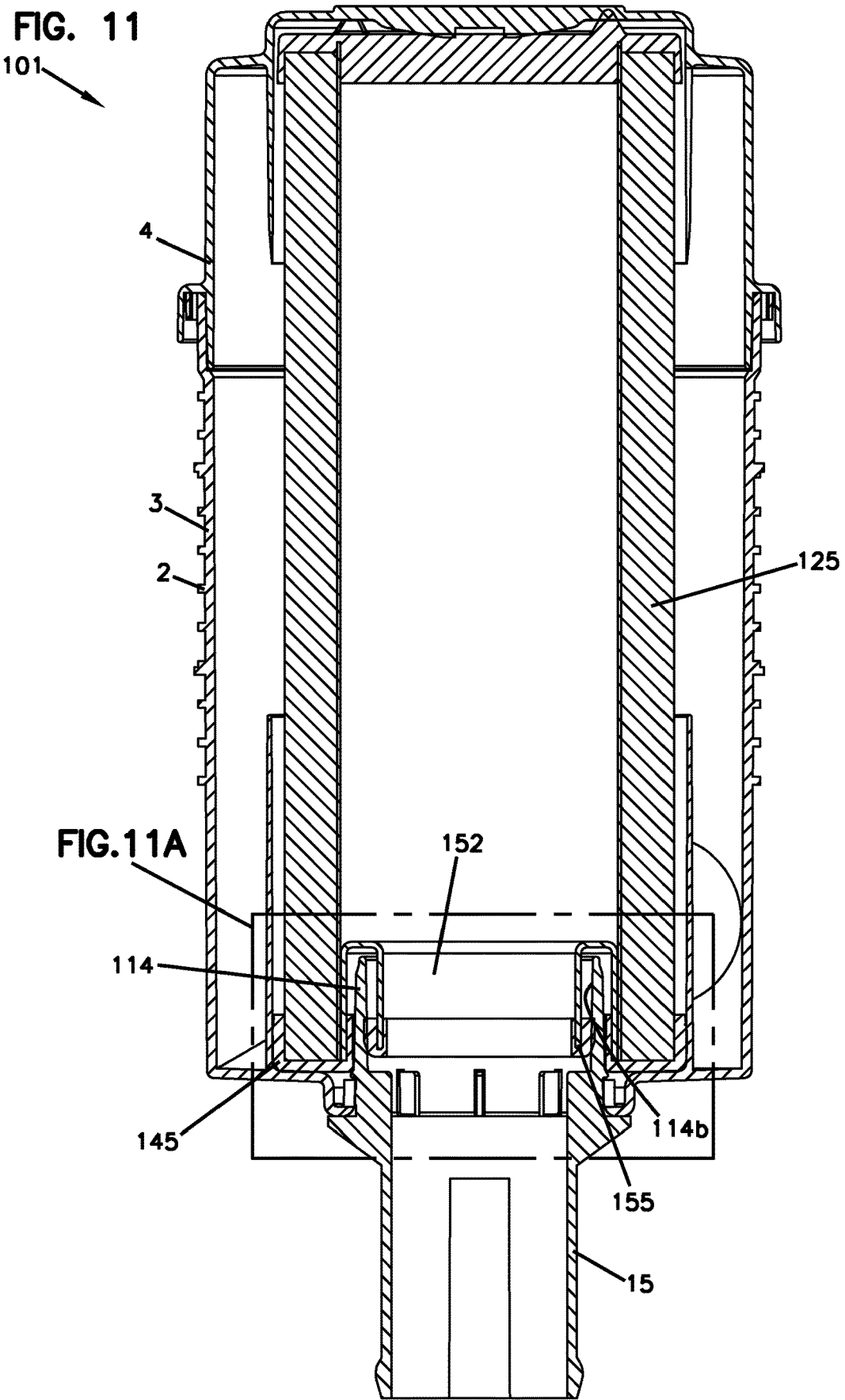

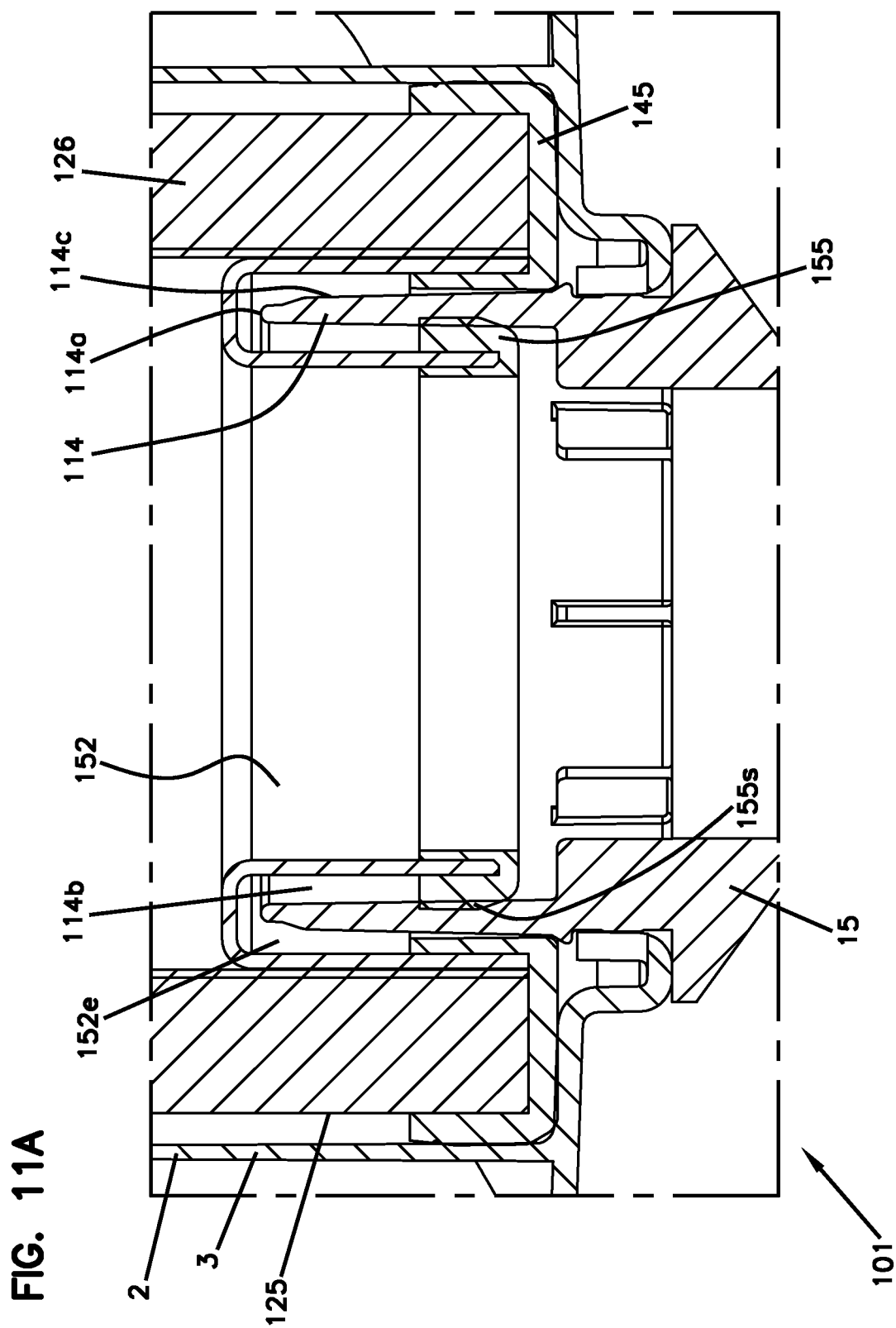

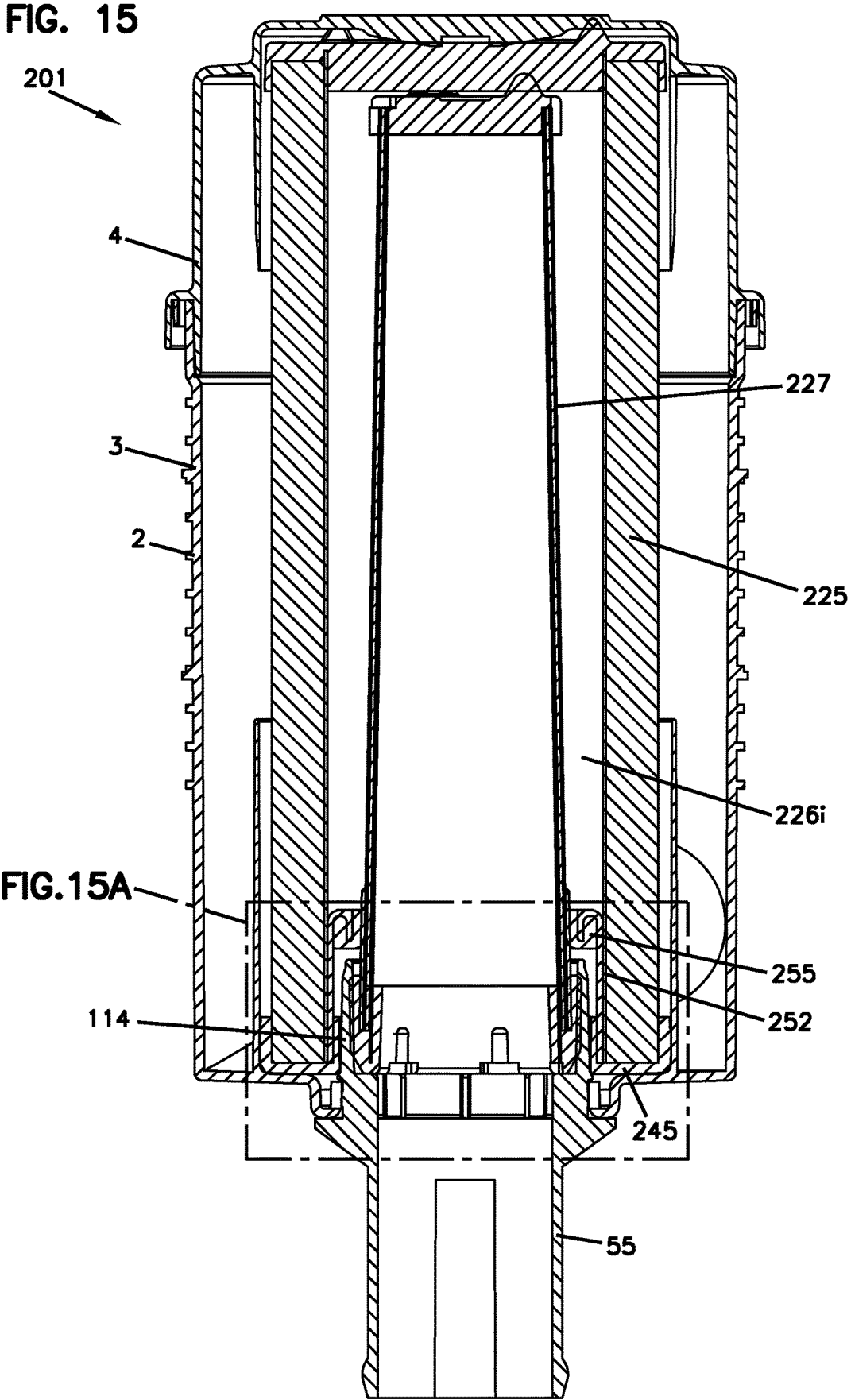

FILTER ELEMENTS, AIR CLEANER ASSEMBLIES, AND METHODS OF USE AND ASSEMBLY

RELATED APPLICATIONS

This application is a National Stage application of PCT International application No. PCT/US2017/064260, filed Dec. 1, 2017, which claims the benefit of priority to U.S. Provisional patent application Serial Number 62/428,913, filed on Dec. 1, 2016, and U.S. Provisional patent application Serial No. 62/463,263, filed Feb. 24, 2017, which applications are incorporated herein by reference. To the extent appropriate, a claim of priority is made to each of the above disclosed applications.

FIELD OF THE DISCLOSURE

The present disclosure relates to filter assemblies, for example air cleaner assemblies, and components and features thereof, and methods of assembly and use. The filter assemblies comprise a housing having a removable and replaceable filter cartridge therein. Various features of filter housings and/or the cartridges are described, which can provide for advantage. Methods of assembly and use are described.

BACKGROUND

Air or other gas filtering is desirable in a number of systems. A typical application is in the filtration of intake air to internal combustion engines. Another is in the filtration of crankcase ventilation filter assemblies. Typically, such systems comprise filter assemblies having a serviceable filter cartridge therein. After a period of use, filter media within a filter housing requires servicing, either through cleaning or complete replacement. Typically, for an air cleaner or crankcase ventilation filter assembly used with an internal combustion engine, for example on a vehicle, the filter media is contained in a removable and replaceable, i.e. serviceable, component, typically referred as a filter element or cartridge. The filter cartridge is configured to be removably sealed within the air cleaner, in use. Improvements in filter arrangements relating to assembly, serviceability, use are desirable. The filter cartridge can be provided as a primary filter cartridge or a secondary filter cartridge. The air cleaner assembly can contain only a primary filter cartridge or both a primary filter cartridge and a secondary filter cartridge.

SUMMARY

Filter assemblies (such as air cleaner assemblies or crankcase ventilation filter assemblies) components therefor; and, features thereof are described. Also described are methods of assembly and use. The filter assemblies generally comprise a housing having a filter cartridge removably positioned therein.

An example assembly includes a first filter cartridge and a second filter cartridge, wherein the first filter cartridge has a first sealing structure configured for sealing against a portion of a housing and having a sealing surface, and wherein the second filter cartridge has a second sealing structure configured for sealing against the first filter cartridge sealing surface. In one embodiment, the first sealing structure is an outwardly directed radial seal while the second sealing structure is an inwardly directed radial seal. Another example assembly includes a first filter cartridge having filtration media defining an interior space with an open end cap at one end and having a sealing structure that is located entirely within the interior space and spaced from the open end cap. In one embodiment, the sealing structure is an outwardly directed radial seal. Another example assembly includes a removable seal surface component installed onto a portion of the housing, wherein a first filter cartridge has a first sealing structure that seals against an interior portion of the removable seal surface component, and wherein a second filter cartridge has a second sealing structure that seals against an outward portion of the removable seal surface component.

There is no specific requirement that an air cleaner assembly, component therefor, or feature thereof include all of the detail characterized herein, to obtain some advantage according to the present disclosure.

BRIEF DESCRIPTION OF THE DRAWINGS

FIG. 3 is an exploded view of the air cleaner assembly shown in FIG. 1, wherein a first filter cartridge, a second filter cartridge, and a serviceable seal surface component are shown as being utilized in conjunction with the housing assembly.

FIG. 4 is a cross-sectional view of the air cleaner assembly of FIG. 1, taken along the line 4-4 in FIG. 2, with the components shown in FIG. 3 installed within the housing assembly.

FIG. 11 is a cross-sectional view of the air cleaner assembly of FIG. 1, taken along the line 4-4 in FIG. 2, with the components shown in FIG. 10 installed within the housing assembly.

FIG. 11A is an enlarged cross-sectional view of a portion of the air cleaner assembly shown in FIG. 11, as indicated at FIG. 11.

FIG. 15 is a cross-sectional view of the air cleaner assembly of FIG. 1, taken along the line 4-4 in FIG. 2, with the components shown in FIG. 14 installed within the housing assembly.

DETAILED DESCRIPTION

Herein, example filter assemblies, filter cartridges, features and components therefor are described and depicted. A variety of specific features and components are characterized in detail. Many can be applied to provide advantage. There is no specific requirement that the various individual features and components be applied in an overall assembly with all of the features and characteristics described, however, in order to provide for some benefit in accord with the present disclosure.

It is noted that a plurality of embodiments are depicted and described. The embodiments are not meant to be exclusive with respect to features depicted. That is, selected features of one embodiment can be applied in one or more of the other embodiments if desired, to advantage. In many examples, the filter assembly depicted is an air cleaner assembly, for example, used to filter intake air for an internal combustion engine. However, the concepts disclosed are not in any way limited to such an application and may be applied across a variety of different applications, such as crankcase ventilation. The disclosed filter assemblies are generally "gas filter assemblies," since the carrier stage being filtered is gas (air or crankcase ventilation gases). While the techniques described herein will typically be used in application for gas filtration, they can be used in the filtration of other materials, for example, liquids, if desired.

I. Filter Assembly—General Description

Figure 1:
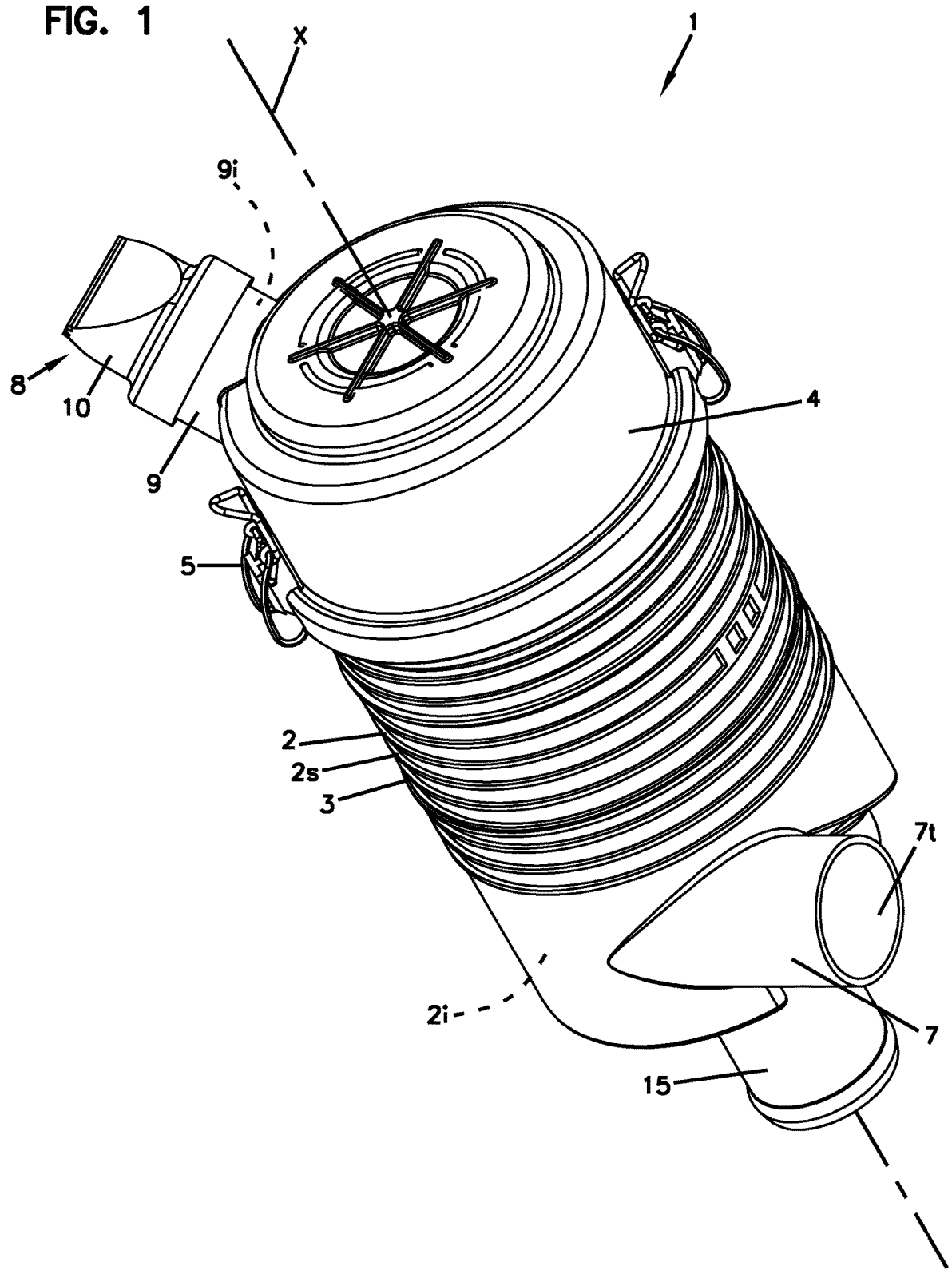
FIG. 1 is a perspective view of an air cleaner assembly including a housing assembly with at least one filter cartridge installed therein according to the present disclosure.

The reference numeral 1, FIG. 1, generally indicates a filter assembly, for example an air cleaner or air cleaner assembly or arrangement in accord with the present disclosure. The filter assembly (in the example an air cleaner assembly) 1 comprises a housing 2. The housing 2 defines a sidewall 2s and includes: a first body or housing section 3; and a second body section or access cover 4. In the example depicted, the access cover 4 is removably secured to the first body section 3, but alternatives are possible. Also although alternatives are possible, for the example depicted, attachment of the cover section 4 to the body section 3 is by a latch arrangement 5 including over center latches. The cover section 4 can alternatively be held to the body section 3 by a twist lock arrangement. An exemplary twist lock arrangement is depicted in U.S. application Ser. No. 15/192,272, filed on Jun. 24, 2016, the disclosure of which is incorporated herein by reference.

In general, the air (gas) cleaner 1 includes an air (gas) flow inlet arrangement 7. In the example depicted, the air flow inlet arrangement 7 is an inlet tube indicated at 7t, on the body section 3. The particular inlet tube 7t depicted, is configured as a side, tangential, inlet, i.e. gas flow is directed tangentially against an inner wall of housing 2, as opposed to being directed directly toward a housing central axis X. Alternate inlet arrangements, locations and direction are possible. However, the tangential inlet arrangement depicted is convenient and advantageous for reasons discussed below.

At 8, a dust/water ejector arrangement is depicted on the housing 2, comprising tube 9. In the example depicted, the tube 9 comprises a portion of access cover 4, although alternatives are possible. The tube 9 is covered by an evacuator valve arrangement 10, in the example depicted comprising a duck-billed valve of a type widely used with air cleaners, see for example WO 2006/06241 A1; U.S. Pat. Nos. 6,419,718 B1; and 8,864,866, incorporated herein by reference. Alternate evacuator valve arrangements can be used.

At 15, an outlet tube or flow tube is depicted, as a portion of housing 2 positioned on a remainder of the housing body section 3. The tube 15 can be formed integral with the housing body 3, but the outlet tube 15 can be a separate piece snap-fit or otherwise attached to the housing body 3.

In operation, air (gas) to be filtered enters the air cleaner assembly through inlet tube 7t. Eventually the air/gas passes through filter media of a filter cartridge arrangement positioned within interior 2i of the housing 2. After passage through media of the filter cartridge, the filtered air is directed to exit the housing through outlet tube 15. From outlet tube 15, the filtered air is directed to downstream equipment such as to a turbo system or to the air intake of an engine system.

The particular air cleaner (filter) assembly 1 depicted includes an optional precleaner stage. The precleaner stage is provided in part by directing air from inlet tube 7t tangentially into interior 2i of the housing 2. The air will then be directed into a cyclonic pattern around an interior of the assembly 1. This will tend to drive a portion of any water or dust particles contained within the air stream, against an interior surface of sidewall 2s. This material, separated from the air stream, will eventually migrate to, and enter, the tube 9, from which ejection occurs through valve 10.

The particular air cleaner assembly 1 depicted is configured so that it can be mounted in a variety of orientations, for example with the central axis X directed vertically, or alternatively with the central axis X directed horizontally.

The housing body section 3 can include a mounting pad arrangement thereon. The mounting pad arrangement can be formed integral with a remainder of the housing 2 or it can be a separate piece. The mounting pad arrangement is used to help secure the housing 2 in place, on equipment with which air cleaner 1 would be used. By having the mounting pad arrangement on the housing section 3, the housing section 3 can be retained in place on the equipment by bolts, or other systems during servicing, with access cover 4 being removably secured to body section 3, for convenient servicing. An exemplary mounting pad arrangement that can be used as part of the housing section 3 is disclosed in U.S. Pat. No. 8,864,866, the disclosure of which is incorporated herein by reference.

As thus far described the air cleaner assembly is similar to many prior air cleaner assemblies, including those depicted and described in WO 2006/06241 A1; WO 2009014988; U.S. Pat. Nos. 6,419,718 B1; and, 8,864,866, the disclosures of which are incorporated herein by reference.

Figure 2:
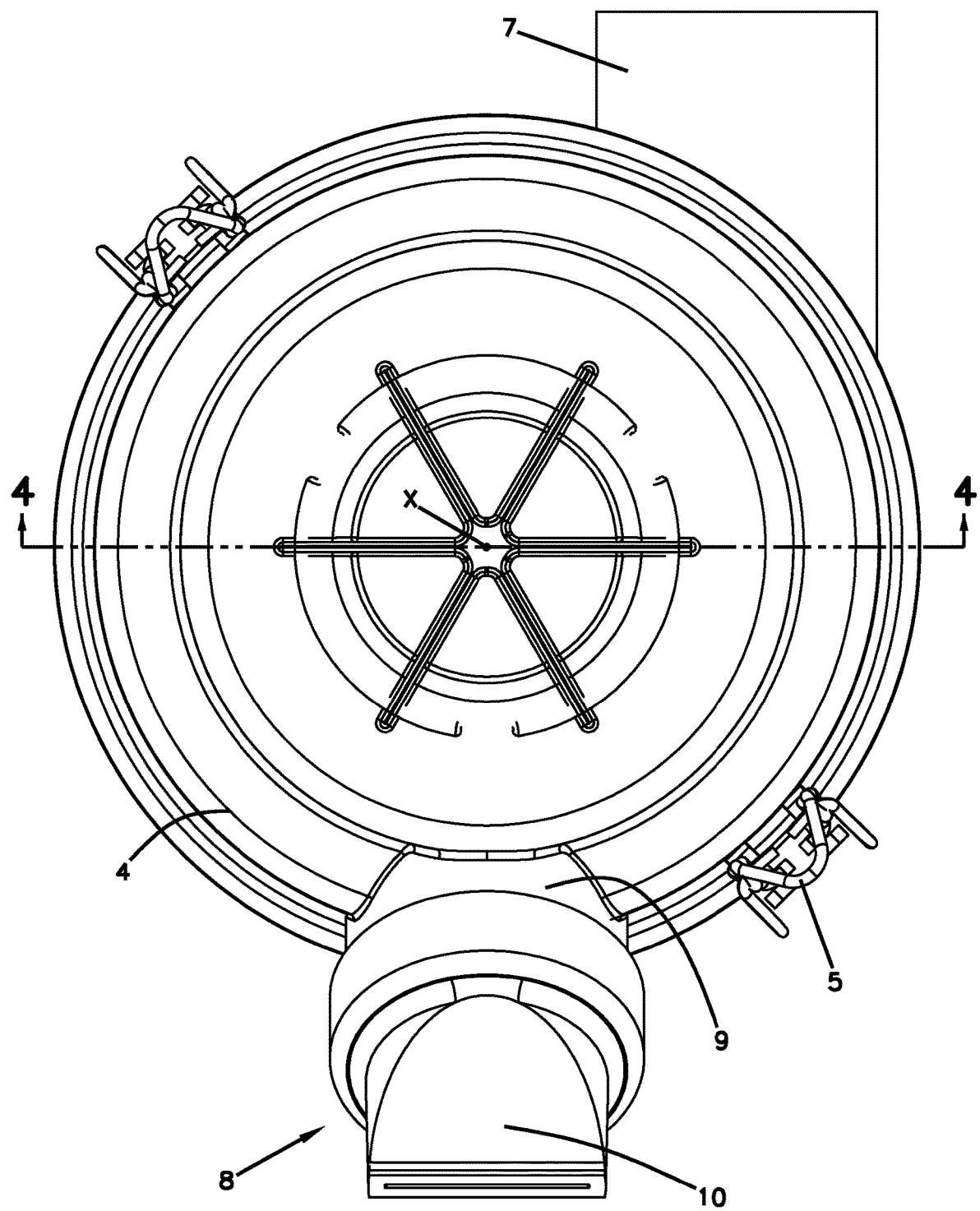
FIG. 2 is a top view of the air cleaner assembly shown in FIG. 1.

Reference is now made to FIGS. 3 and 4, which show the housing assembly of FIGS. 1 and 2 used in conjunction with a first example of serviceable internal filtration components that can be provided within the housing 2. In the exploded view of FIG. 3, filter cartridge 25, filter cartridge 27, and serviceable seal surface component 17 are viewable and shown as being positionable within housing interior 2i. Alternative serviceable component arrangements which utilize the same housing 2 are shown at FIGS. 10 to 13 and at FIGS. 14 to 18. The variations of filter cartridge 25 will be described in greater detail below. In general, the cartridge 25 is a serviceable component that includes an extension of filter media 26 through which air to be filtered passes, before it can exit assembly 1. In addition, the variations of filter cartridge 27 will be described in greater detail below. In general, the cartridge 27 is a serviceable component that includes an extension of filter media 28 through which air to be filtered passes before it exits assembly 1. The filter cartridge 25 can be referred to as a primary filter cartridge or primary filter element, and the filter cartridge 27 can be referred to as a secondary or safety filter cartridge or secondary or safety filter element. The serviceable seal surface component 17, which is present in only the first embodiment at FIGS. 3 to 9, will also be described in greater detail below.

By the term "serviceable component" as used herein, and in reference to the cartridges 25 and 27 and seal surface component 17, it is meant that the seal surface component 17 and cartridges 25, 27 are removable and replaceable in the air cleaner assembly 1. Thus, as the media 26 and/or 28 occludes during use, the cartridge 25 and/or the cartridge 27 can be removed, and can be refurbished or replaced. Similarly, as the seal surface component 17 becomes worn, damaged, or otherwise unsuitable for use, the seal surface component 17 can be removed, and can be refurbished or replaced.

Referring to FIG. 2, it can be seen that housing 2 includes an optional, but advantageous, shield arrangement 29 surrounding a selected portion of the filter cartridge 25. The shield arrangement 29 includes first shield section 30 in housing body section 3, oriented to surround a portion of the cartridge 25 at that location, creating an annulus 31 between the shield 30 and outer sidewall 32. Air from inlet 7 is directed into inlet aperture 7a and into annulus 31, and in a cyclonic pattern. Shield 30 inhibits direct impingement, of the dust and other material carried by the inlet air in annulus 31, and onto the media 26 until after the air has moved at least partially through the cyclonic pattern and past shield 30 in a direction toward access cover 4.

In FIG. 4, at 33 a second shield section of shield arrangement 29 is depicted in access cover 4. The second shield section 33 defines an annulus 34 between the shield 33 and sidewall 35 of section 4. As shown at FIG. 1, an egress or outlet aperture is located in the sidewall 2 from housing interior 2i to interior 9i of tube 9. The egress or outlet aperture 37 is in communication with the annulus 34. The shield 33 helps facilitate removal of dust and other materials through aperture 37 into dust ejector arrangement 8.

Use of shield arrangements analogous to shield arrangement 29, with one or more shields analogous to sections 30 and 33, is common in many air cleaner arrangements, see for example WO 2006/06241 A1; WO 2009/014988; U.S. Ser. Nos. 61/446,653; 61/473,296; 6,419,718 B1; and 8,864,866, the disclosures of which are incorporated herein by reference. Analogous features and principles can be used here.

It is noted that the use of the shield arrangement 29 and dust ejector arrangement 8 is consistent with many applications in which a "dual stage" or "two stage" air (gas) cleaner is desired, having a first precleaner stage to separate water and larger particles from the air before it passes into the filter cartridge 25 (the second stage). However, such features are generally optional, and many of the principles of the present disclosure can be applied in air cleaners that do not have such a two stage configuration or precleaner stage. Downstream of the filter cartridge 25 is the secondary filter cartridge 27 so that air passes through both of the filter cartridge 25 and the filter cartridge 27 prior to exiting via the air outlet 15. It should be understood that the air cleaner assembly 1 can be operated with the filter cartridge 25 alone, with the filter cartridge 27 alone, or with both the filter cartridge 25 and the filter cartridge 27 provided together and as shown in FIG. 2.

II. Filter Assembly—First Filter Arrangement Embodiment

As indicated above, many of the features previously identified and discussed with respect to FIGS. 1-2 relating to general air cleaner configuration (filter assembly) and operation are well known features, forms of which have been used in a variety of systems. Certain unique characteristics of the present air cleaner, of FIGS. 1-2 and 3-9, relate to the inclusion of the serviceable seal surface component 17. The serviceable seal surface component 17 provides seal surfaces against which the filter cartridges 25, 27 can be sealed. As the component 17 is serviceable, a new sealing surface can be provided in the assembly at any point in time, for example, when wear or damage to the component 17 occurs or when damage to an originally provided permanent seal surface (e.g. filter cartridge baffle 114) on the housing 2 becomes worn or damaged. In this section, selected features relating to the serviceable seal surface component 17 are discussed.

Figure 6:
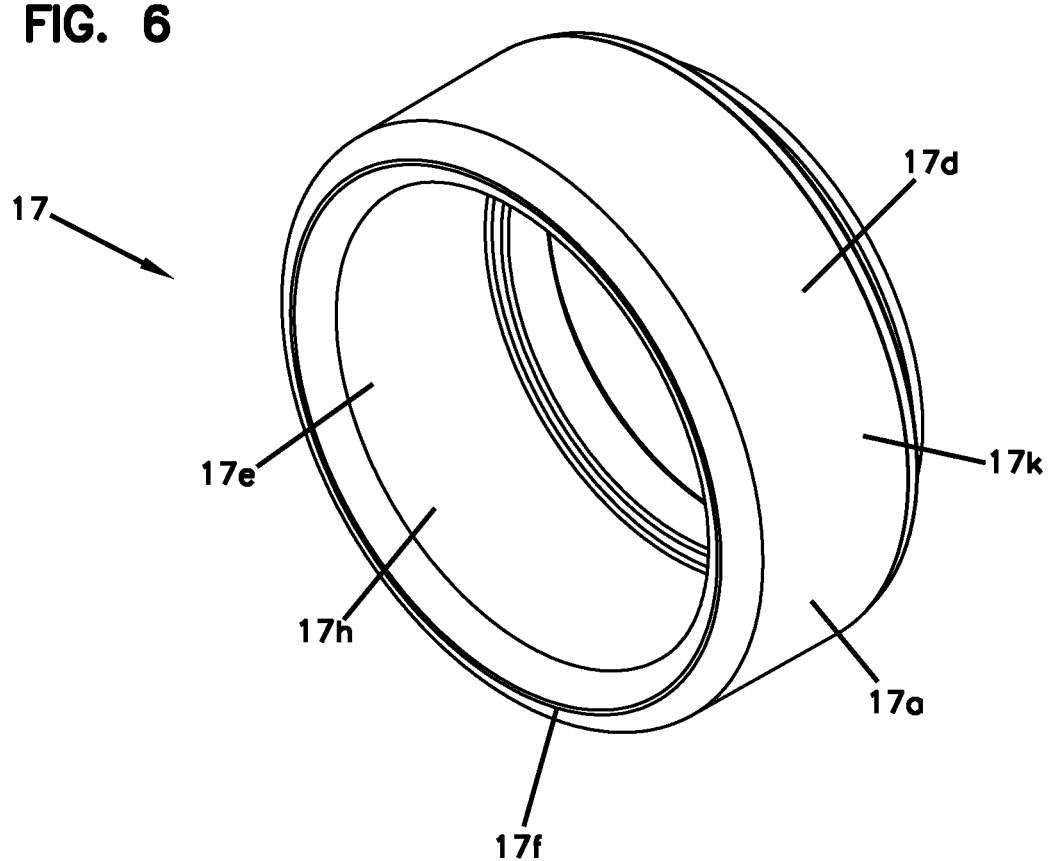
FIG. 6 is a perspective view of the serviceable seal surface component shown in FIG. 3.
Figure 7:
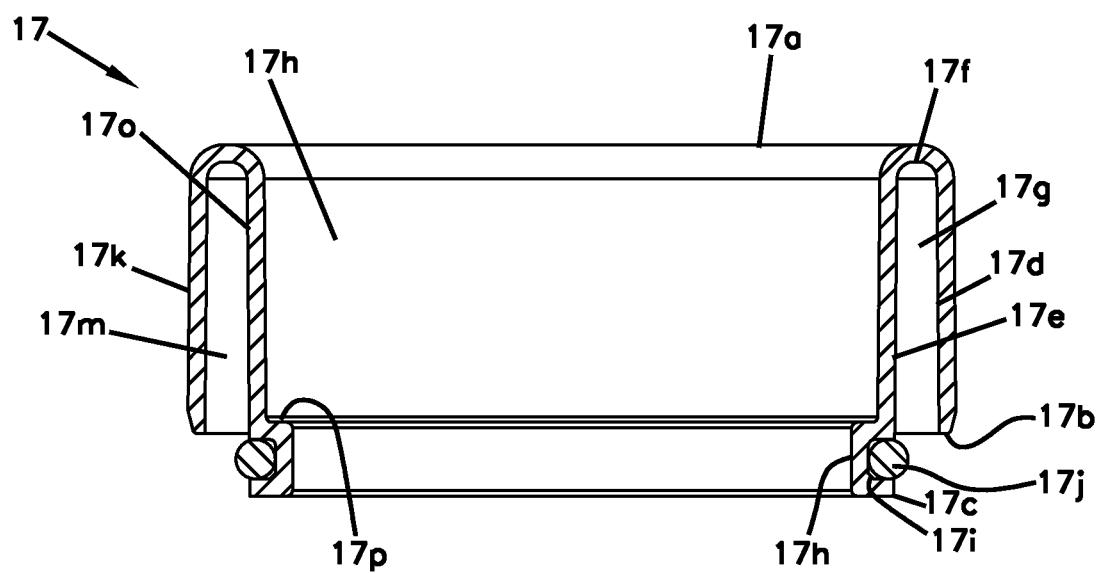
FIG. 7 is a cross-sectional view of the serviceable seal surface component shown in FIG. 7.

As most easily seen at FIGS. 6 and 7, the serviceable seal surface component 17 includes a main body 17a (e.g., ring or annular-shaped) extending from a first end 17b to a second end 17c. Between the first end 17b and the second end 17c, the main body 17a includes a first extension segment 17d and a generally parallel second extension segment 17e joined by a connecting portion 17f. The first and second extension segments 17d, 17e are spaced apart such that an annulus 17g is formed therebetween. The second extension part 17e is further joined to a seal structure 17h which defines a channel 17i into which a seal member 17j is received. In one aspect, the main body 17a of the component 17 includes an inwardly stepped portion 17p. The inwardly stepped portion 17p can act as a stop against which the end of the filter cartridge 27 can rest.

As presented, the main body 17a is an integrally formed unit having all of the aforementioned components 17b-17i with the exception of the seal member 17j. In the example shown, the seal member 17j is a separate O-ring. However, in an alternative arrangement, the seal member 17j can also be integrally formed as a portion of the main body 17a. Additionally, the first and second extensions 17d, 17e themselves may provide the sealing surfaces. The main body 17*a* may be formed from a variety of materials, such as an injection molded polymeric material.

In one aspect, the first extension part 17*d* defines an outer sealing surface 17*k* and an inner sealing surface 17*m* while the second extension part 17*e* defines an inner sealing surface 17*n* and an outer sealing surface 17*o*. When the serviceable seal surface component 17 is installed into the housing 2, a filter cartridge baffle 114 of the housing 2 is received into the annulus 17*g* formed between the first and second extension parts 17*d*, 17*e* until, for example, contact is made between an end 114*a* of the filter cartridge baffle 114 or between the second end 17*c* of the main body 17*a* and a surface of the housing 2. As configured, the filter cartridge baffle 114 is a portion of the outlet tube 15 that extends into the interior volume 2*i* of the housing 2. Once the component 17 is fully inserted, the component surface 17*m* faces an outer surface 114*c* of the baffle 114 while the component surface 17*o* faces an inner surface 114*b* of the baffle 114. In this position, and as most easily seen at FIG. 4A, the seal member 17*j* forms a seal against the inner surface 114*b* of the filter cartridge baffle 114. This seal formed between the seal member 17*j* and the filter cartridge baffle 114 ensures that a continuous seal will exist between the filter cartridge baffle 114 and any component sealed to the serviceable seal surface component 17.

In some applications, the surfaces 114*b* and 114*c* of the filter cartridge baffle 114 initially serve as the sealing surfaces against which the filter cartridges 25, 27 form a seal. Over time, one or both of these surfaces may become worn or damaged. In such cases, the serviceable seal surface component 17 can be mounted onto the filter cartridge baffle 114 to provide new seal surfaces 17*n*, 17*k*. As the seal member 17*j* is located proximate the second end 17*c* of the main body 17*a* and adjacent to the seal surface 17*n*, the seal member 17*j* does not interfere with a seal between the component 17 and a filter cartridge 27. It may also be useful to install the serviceable seal surface component 17 in instances where it is desired to provide a filter cartridge 25 or 27 having seals that are sized or shaped incompatibly with the filter cartridge baffle 114.

The filter cartridge 25 can be referred to as a primary filter cartridge or as a primary filter element, and the filter cartridge 27 can be referred to as a secondary or safety filter cartridge or as a secondary or safety element. In general, the primary filter cartridge or primary filter element and the secondary or safety filter cartridge or the secondary or safety filter element can be referred to as the filter cartridge or the filter element for convenience. Based on context, it should be apparent that references being made to the primary filter cartridge or the secondary filter cartridge.

In general terms, again, the cartridges 25 and 27 are serviceable components. That is, they can be removed and replaced through the lifetime of the air cleaner 1, just as described for the serviceable seal surface component 17. A releasable seal is needed between the cartridge 25 and the serviceable seal surface component 17, and between the cartridge 27 and the component 17, to allow the cartridges to be serviceable components and to ensure that unfiltered air does not bypass the cartridge 25 and/or the cartridge 27 and enter the outlet tube 15, as this can cause damage to the engine.

The filter cartridge 25 generally includes filtration media 26 extending between first and second opposite media ends 41 and 42. First media end 41 is engaged by a first end cap or piece 45. The second media end 42 is engaged by a second end cap or piece 46. Thus, the media 26 extends between opposite end caps (or end pieces) 45, 46.

Although alternatives are possible with selected techniques described herein, for the example depicted, the filter media 26 is configured surrounding an open filter interior 26*i*, generally around a central axis X of the air cleaner 1 and cartridge 25. The media 26 can be pleated media, although alternatives are possible. The media 26 can be configured in a cylindrical pattern as shown, if desired, although alternatives are possible. For example, the media 26 can be somewhat conical in extension between the opposite ends 41, 42. Also, the media can be configured with non-circular inner and/or outer perimeters; for example oval or other cross-sectional configurations are possible. In addition, the primary filter cartridge 25 can be provided with a screen or support structure 26*s* extending from the first end 41 to the second 42 to help support the filtration media 26 while allowing gas (air) to pass therethrough. The filtration media 26 can be embedded in the first and second end caps 45 and 66. In addition, the screen or support structure 26*s* for the filtration media 26 can be embedded in the first and second end caps 45 and 46.

Although alternatives are possible with selected techniques described herein, the second end piece or cap 46 is typically a closed end piece or cap, extending completely across the media 26 at the second end 42, closing that end 42 of the media 26 and the filter interior 26*i*. That is, end piece or cap 46, for the example depicted, is a closed end piece or cap, i.e. an end cap having no aperture therethrough in communication with the open filter interior 26*i*.

First end piece or cap 45 on the other hand, is an open end piece or cap. That is, it surrounds and defines a central aperture 50 in communication with the media, in the example via open filter interior 26*i*. In typical use, aperture 50 is an air flow exit aperture from the media, for example open filter interior 26*i*, for filtered air. In alternate applications with a reverse direction of gas flow during filtering, aperture 50 can be an inlet aperture. In general, it is a gas flow aperture.

For the example depicted, first end piece 45 extends completely across all media 26 of the cartridge 25, from an outer perimeter 26*x* to an inner perimeter 26*o*. The first end piece 45 typically has only one, central, aperture 50 therethrough.

Again, when the access cover 4 is removed from the housing body section 3, access to interior 2*i* is provided for either installation or removal of the cartridge 25. The filter cartridge 25, then, needs to be adequately removably sealed to the serviceable seal surface component 17 to protect against flow of unfiltered air into the exit tube 15. To provide for this, the cartridge 25 is provided with a primary (or housing) seal arrangement 55.

Figure 4A:
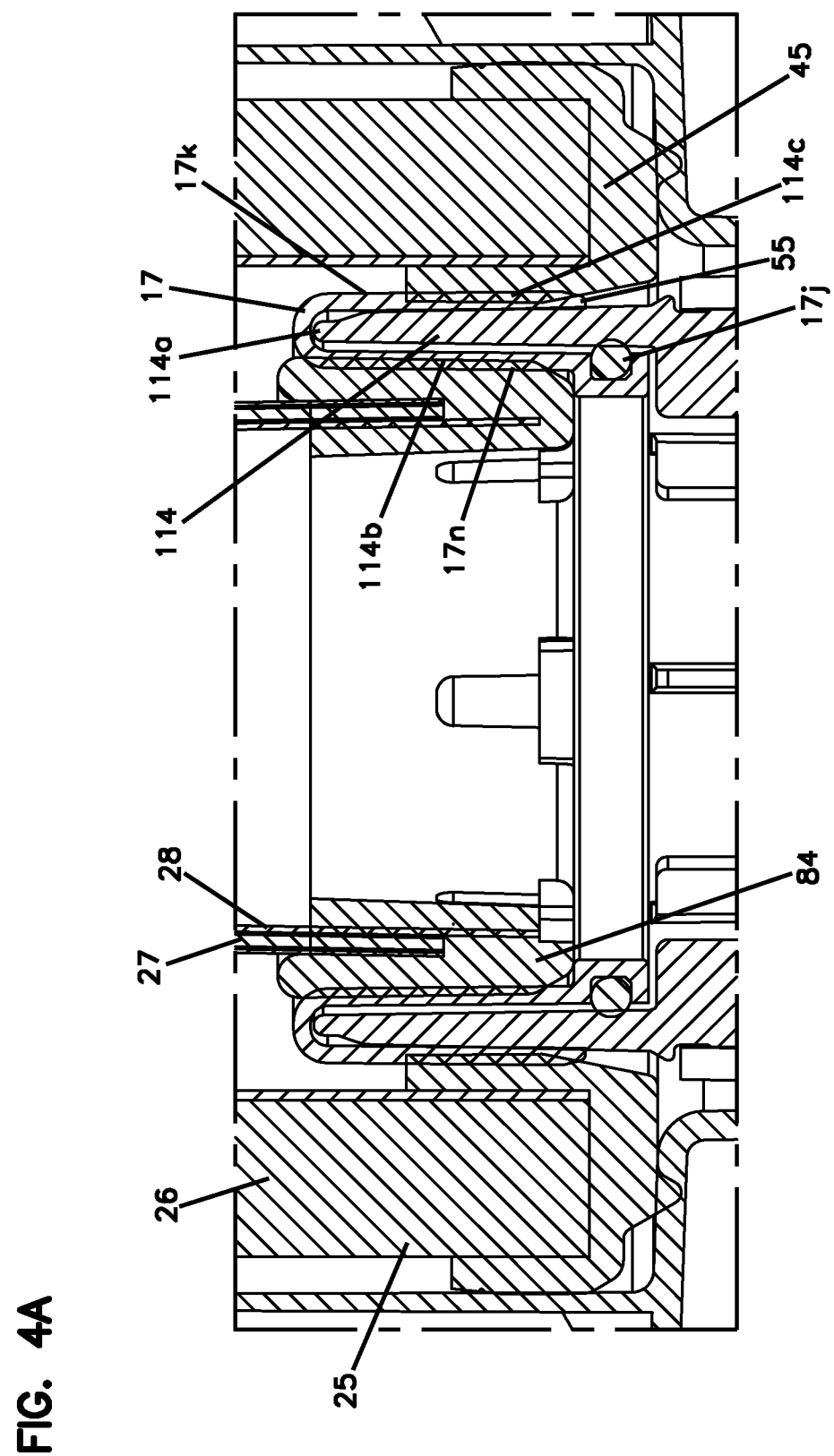
FIG. 4A is an enlarged cross-sectional view of a portion of the air cleaner assembly shown in FIG. 4, as indicated at FIG. 4.
Figure 5:
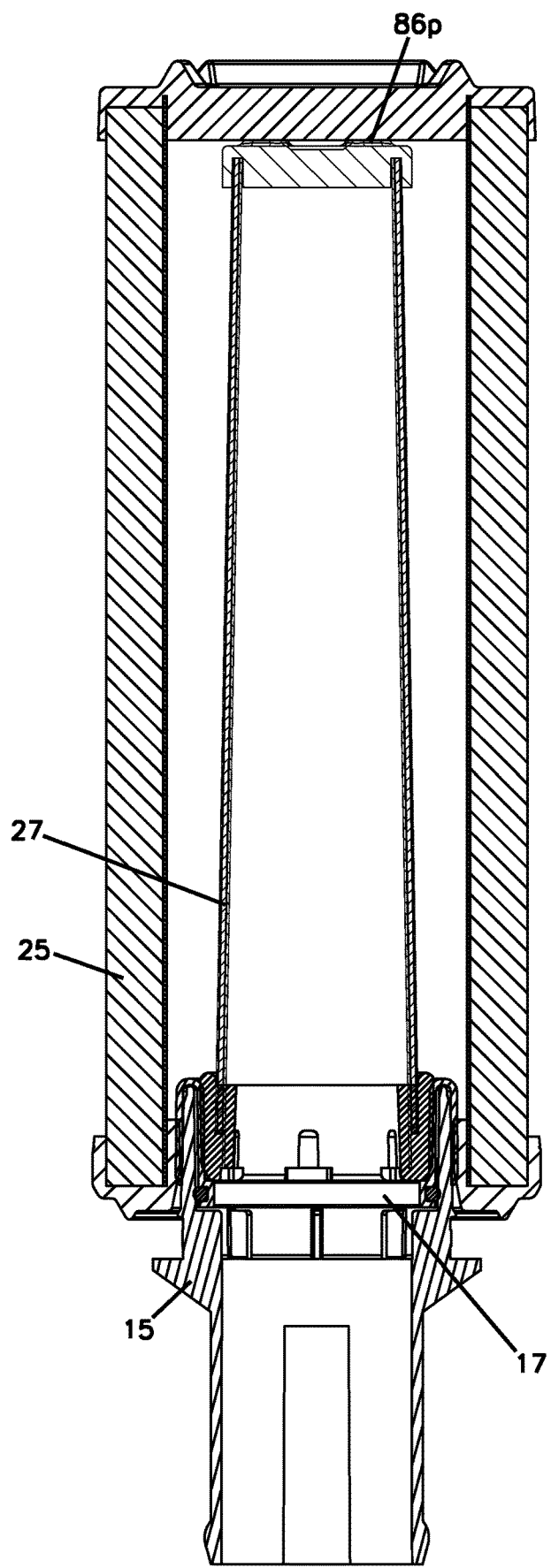
FIG. 5 is a cross-sectional view similar to FIG. 4, but with the housing assembly not being shown.
Figure 9:
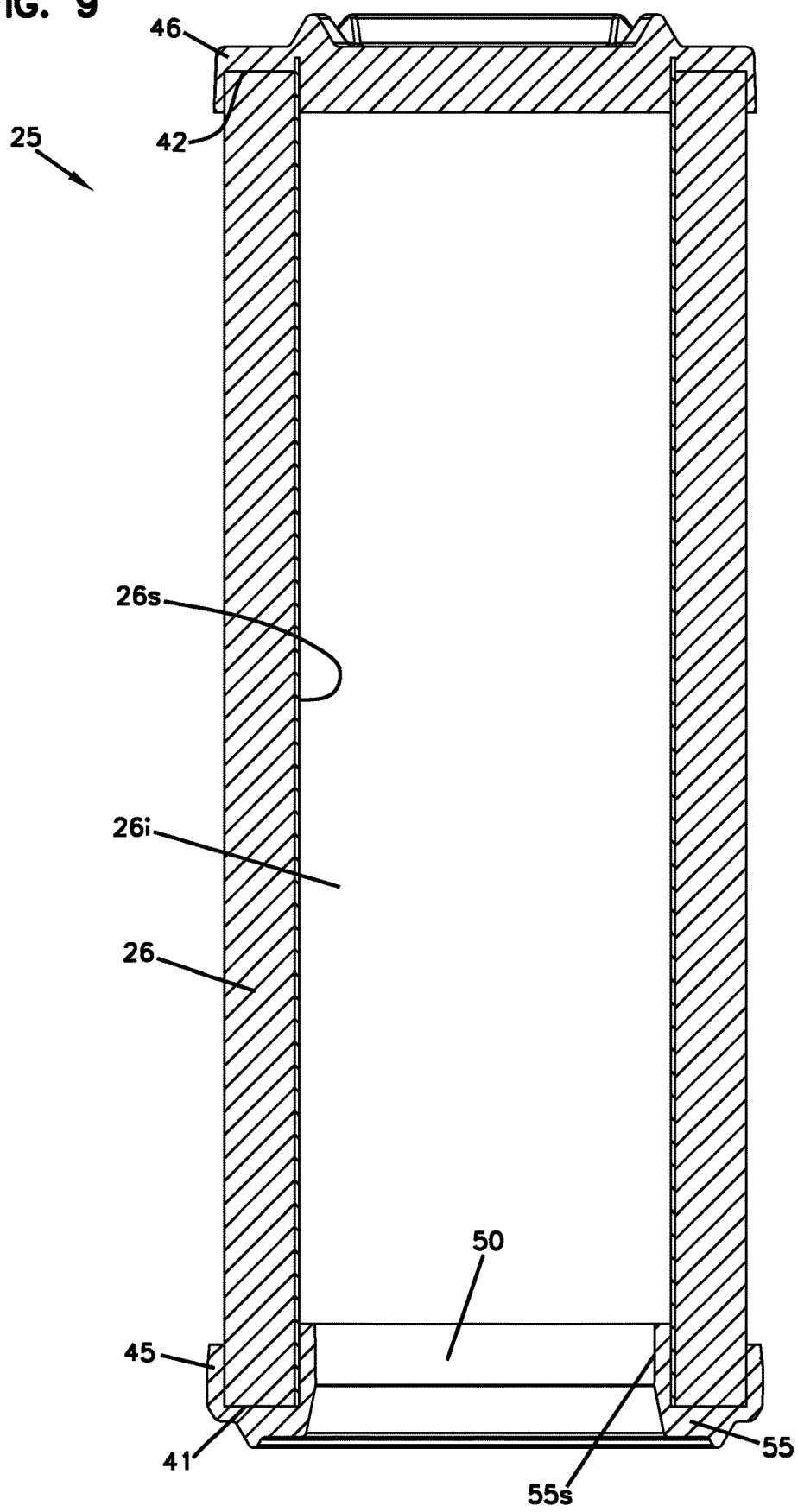
FIG. 9 is a cross-sectional view of the first filter cartridge shown in FIG. 3.
Figure 10:
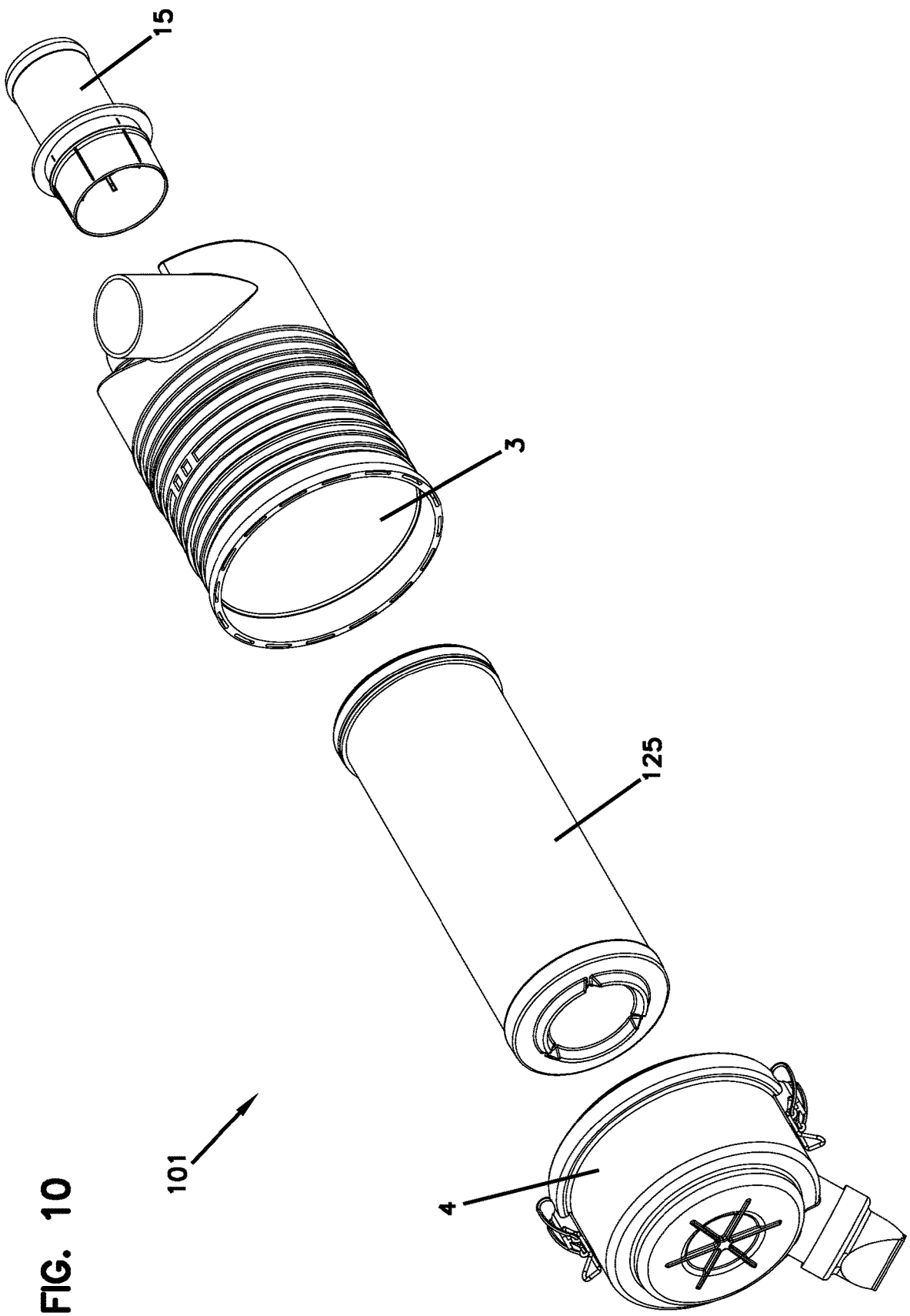
FIG. 10 is an exploded view of the air cleaner assembly shown in FIG. 1, wherein a second example of a first filter cartridge is shown as being utilized in conjunction with the housing assembly.

With respect to the first housing seal or primary seal arrangement 55, and other features of first end cap 45, attention is directed to FIGS. 4, 4A, and 9. The primary seal arrangement 55 can be seen as defining a radially directed seal or seal surface 55*s* directed to engage the surface 17*k* of the serviceable seal surface component 17, for releasable sealing. Accordingly, the primary seal arrangement 55 forms an inwardly directed radial seal with the serviceable seal surface component 17 when the primary filter cartridge 25 is installed in the filter assembly 1.

Still referring to FIGS. 4, 4A, and 9, it will be understood that the surface 55*s*, of primary seal arrangement 55, that forms a seal with component 17 is generally a radially directed surface. Hence, the primary seal arrangement 55 can be referred to as a radially directed seal. By "radially"

in this context, it is meant that the seal or seal surface (and the compression of the seal surface during sealing) is directed generally toward or away from (i.e. around) central axis X. The particular surface 55s in the example depicted, is radially inwardly directed relative to the central axis X, so the seal arrangement 55 can be characterized as "radially inwardly directed." It is noted however, that a radially outwardly directed seal can be used with some principles in accord with the present disclosure.

It is noted that in the example depicted, the housing seal arrangement 55 comprises a portion of end cap 45. In more general terms, the housing seal arrangement is mounted on a filter cartridge and is configured to releaseably seal to a housing or component 17, whether that particular housing seal arrangement comprises a portion of an end piece or not.

The preferred and advantageous housing seal arrangements described herein are generally "non-clamp" or "clampless" housing seal arrangements. By this it is meant that they are established as the cartridge is inserted into the housing, without the need for tightening the clamp or connector of some type.

In one aspect, the end cap 45 and seal arrangement 55 can be constructed in a manner so that the amount of radial compression of end piece (cap) material in a region between surface 55s and the support 62 will have a maximum compression of at least 10%, typically at least 15%, preferably no more than about 40% and will typically be with a maximum compression within the range of about 20-40%, inclusive. In some implementations, a compression between 30-40% is useful. To accomplish this, a seal support can be provided within the end cap 45.

Figure 8:
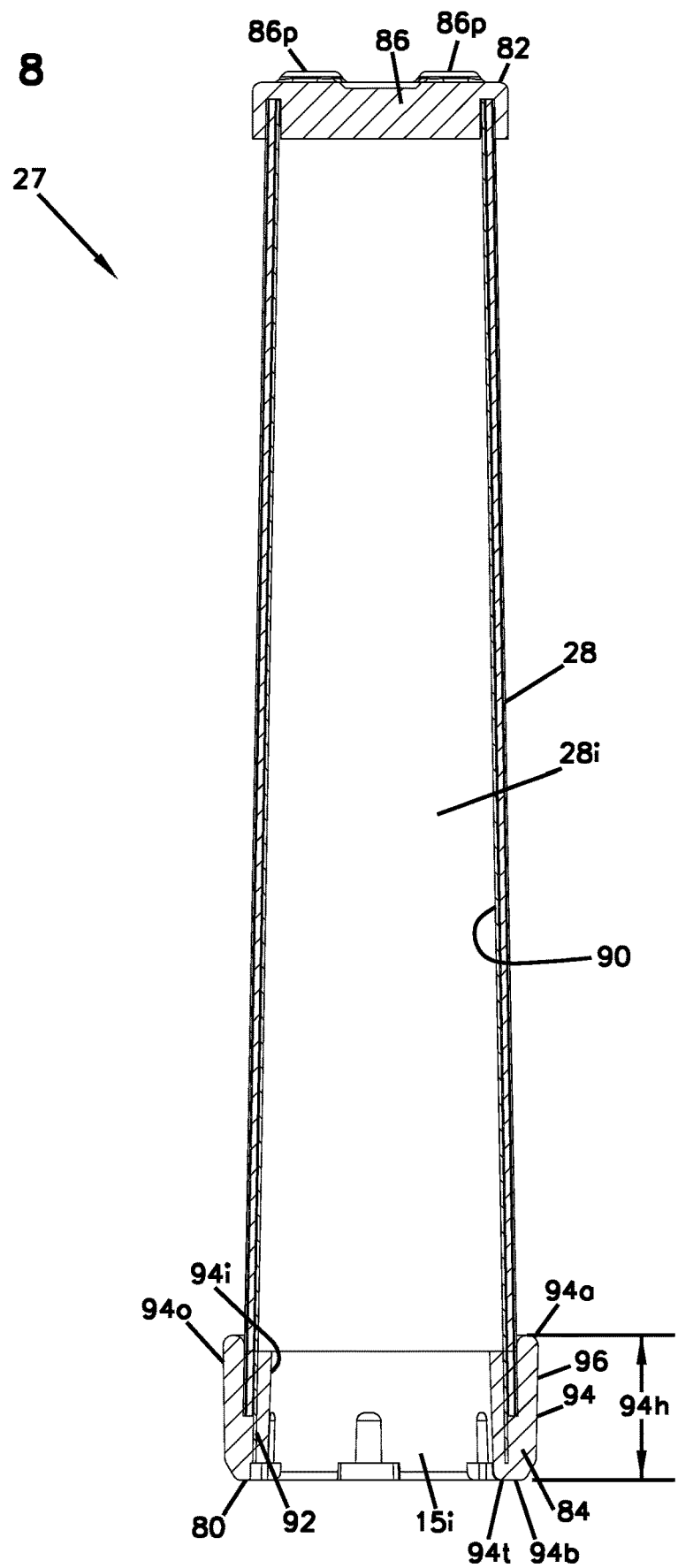
FIG. 8 is a cross-sectional view of the second filter cartridge shown in FIG. 3.

Now referring to the filter cartridge 27 depicted in FIGS. 4, 4A, and 8. The filter cartridge 27 can be referred to a secondary filter element or as a safety filter element. During the servicing of the filter assembly 1, wherein the primary filter cartridge 25 is removed and replaced with a new or refurbished filter cartridge, the secondary filter element 27 prevents dust or debris from entering into the outlet tube 15. Furthermore, in the event of a malfunction in the primary filter cartridge 25, the secondary filter cartridge 27 is available to prevent dust or debris from entering the outlet tube 15.

The secondary filter cartridge 27 includes a first end 80, and second end 82, and filtration media 28 extending between the first end 80 and the second end 82. In the exemplary secondary filter cartridge 27 depicted, the first end 80 includes a first endcap 84 and the second end 82 includes a second end cap 86. The secondary filter cartridge 27 can be provided, if desired, without a second end cap 86. That is, the secondary filter cartridge 27 can be provided so that the media extends over the second end 82. In addition, the secondary filter cartridge 27 can be provided with a screen or support structure 90 extending from the first end 80 to the second 82 to help support the filtration media 28 while allowing gas (air) to pass therethrough. The filtration media 28 can be embedded in the first and second end caps 84 and 86. In addition, the screen or support structure 90 for the filtration media 28 can be embedded in the first and second end caps 84 and 86.

The secondary filter cartridge 27 can be constructed so that the filtration media 28 is configured surrounding an open filter interior 28i. The media 28 can be provided as depth media, although alternatives are possible. For example, the media 28 can be provided as pleated media or as multilayer laminate media such as the media disclosed in PCT Publication No. WO 2015/010085, the entire disclosure of which is incorporated herein by reference. In addition, the media 28 can be provided as the filtration media layer arranged in a wave configuration disclosed in PCT Publication No. WO 2015/010085. The media 28 can be configured in a cylindrical pattern as shown, if desired, although alternatives are possible. For example, the media 28 can be somewhat conical in extension between the opposite ends 80, 82. In addition, the media can be configured with non-circular inner and/or outer perimeters. For example, the media can be configured having an oval, circular, or other cross-sectional configuration.

The second end cap 86 can be provided as a closed end piece or cap, extending completely across the media 28 at the second end 82, closing the second end 82 of the filtration media 28 of the filter interior 28i. An exemplary top view of the second end cap 86 is shown, for example, in FIG. 8. The second end cap 86 can include projections 86p that help provide separation and cushioning between the secondary filter cartridge 27 and the primary filter cartridge 25. Furthermore, the second end cap 86 can include a plurality of radially extending ridges.

The second end piece or cap 86 can be characterized as a closed end piece or cap, i.e. an end cap having no aperture therethrough in communication with the open filter interior 28i. In various alternative configurations, the second end 82 can be provided without an end cap. In one variation of the secondary filter element 27 without a second end cap 86, the filtration media 28 extends over and encloses the second end 82. That is, the filtration media 28 can form the closure at the second end 82 thereby preventing unfiltered air from entering into the open filter interior 28i. In an alternative, the second end 82 can be provided with a seal arrangement that mounts onto a secondary filter element support structure wherein the support structure includes a closed end corresponding to the second end 82 of the secondary filter cartridge 27. A remaining portion of the support structure would be open to flow of gas (air) therethrough. However, the closed end of the support structure would, in combination with the seal at the second end of the secondary filter cartridge 27 prevent unfiltered air from entering into the open filter 28i.

The first end cap 84 includes a support 92 and a secondary seal member 94. The support 92 can be provided as part of the screen or support structure 90 or the support 92 can be provided as a separate component such as a plastic preform. As shown in FIG. 8, the support 92 is part of the screen 90. That is, the screen 90 extends into the secondary seal member 94 a sufficient amount to help support the secondary seal member 94 when provided in a sealing relationship with the housing 2. The combination of the screen 90 (or support 92) and the secondary seal member 94 forms the first end cap 84. The support 92 helps support the secondary seal member 94 when it engages the serviceable seal support structure 17. The secondary seal member 94 can be referred to as a housing seal structure or arrangement for the secondary filter cartridge 27. In general, the secondary seal member 94 can be molded onto the support 92 and provides an outwardly directed sealing surface 96, directed to engage the surface 17n of the separate seal surface component 17, for releasable sealing. When molded, the secondary seal member 94 can be provided having an outer section 94o on the outside of the support 92 and having an inner section 94i on the inside of the support 92. In addition, the secondary seal member 94 can include a portion 94t extending over a tip of the preform 92. The secondary seal member 94 extends in a perimeter around a central open volume 15i. The central open volume 94i can be in communication with the open filter interior 28i. During operation of the filter assembly 1 when the secondary filter cartridge 27 is installed, air passes through the filtration media 28 into the open filter interior 28i, and then passes through the central open volume 94i and into the outlet tube 15.

The secondary seal member 94 can be characterized as having an axial distance or height 94h from the bottom 94b to the top 94a that is sufficient to provide a seal with the serviceable sealing surface component 17. As most easily seen at FIGS. 4, 4A, and 5, the secondary seal member sealing surface 96 of the end cap 94 forms a seal with the inner sealing surface 17n of the second extension part 17e of the serviceable seal surface component 17.

III. Filter Assembly—Second Filter Arrangement Embodiment

Referring to FIGS. 10 to 13, a second filter arrangement 101 is shown that can be utilized with the housing 2 depicted in FIGS. 1 to 4. As many of the features for this embodiment are similar to the those previously discussed for the first embodiment, the description for the first embodiment is incorporated into this description for the second embodiment. Where similar features do exist, similar reference numbers will be used, although in some instances a "100" series number will be used for the components of the second filter arrangement 101 (e.g. 125 for filter cartridge instead of 25). The following description will be limited to the differences of the second embodiment over the first embodiment. The primary difference is that that the second embodiment is not shown as including a safety filter cartridge 27 or a serviceable sealing surface component 17 and the main filter cartridge 125 of the second embodiment is configured with a remote sealing structure 155 that enables the main filter cartridge to seal to the inside surface 114b of the filter cartridge baffle 114, even though, as shown, the cartridge is positioned primarily to the outside of baffle 114.

Similar to the filter cartridge 25, the filter cartridge 125 is shown with pleated media 126 forming an interior area 126i and extending between a first end 141 and a second end 142, wherein an open end cap 145 is provided at the first end 141 and a closed end cap 146 is provided at the second end 142. However, in this embodiment, the open end cap 145 is not provided with a seal structure or arrangement. Instead, a remote seal structure 155 is provided that is spaced inwardly from the open end cap 145 and that is disposed entirely within the interior area 126i. As shown, the seal structure 155 defines a radially outward directed sealing surface 155s at a diameter D155 which is less than an internal diameter D145 of an interior surface 145a of the open end cap 145. Accordingly, an annulus 157 is formed between the open end cap 145 and the seal structure 155. Taken together, the end cap 145, the seal structure 155, and the interconnecting extension member 152, discussed in detail below, can be collectively referred to as a seal arrangement 150.

The seal structure 155 is supported by an extension member 152. The extension member 152 extends between a first end 152a and a second end 152b, wherein the first end 152a can be embedded within the open end cap 145 and the second end can be embedded in the seal structure 155. The seal structure may be alternatively constructed to utilize an O-ring or an overmolded construction. As shown, the extension member 152 includes a first segment 152c extending from the first end 152a towards the closed end cap 146 and a second segment 152d extending from the second end 152b toward the closed end cap 146 in a spaced apart, parallel relationship with the first segment 152c. The first and second segments 152c, 152d are joined by a segment 152e, the length of which determines the dimension of the resulting annulus 152f between the first and second segments 152c, 152d. In one aspect, the length H152c of the first segment 152c is less than the length H152d of the second segment such that the end face 155a seal structure 155 is axially spaced or recessed from the end face 145c of the open end cap 145 by a distance D1. In such a configuration, the seal structure 155 can be characterized as being fully within the interior area 126i defined by the media 126.

The seal structure 155 can be made from a similar material as the end cap 145, such as a polyurethane material or an injection molded polymeric material. The extension member 152 can be formed from a variety of materials, for example polymeric and metal materials. In one example, the end cap 145, the extension member 152, and the seal structure 155 are integrally formed as a single component.

Figure 12:
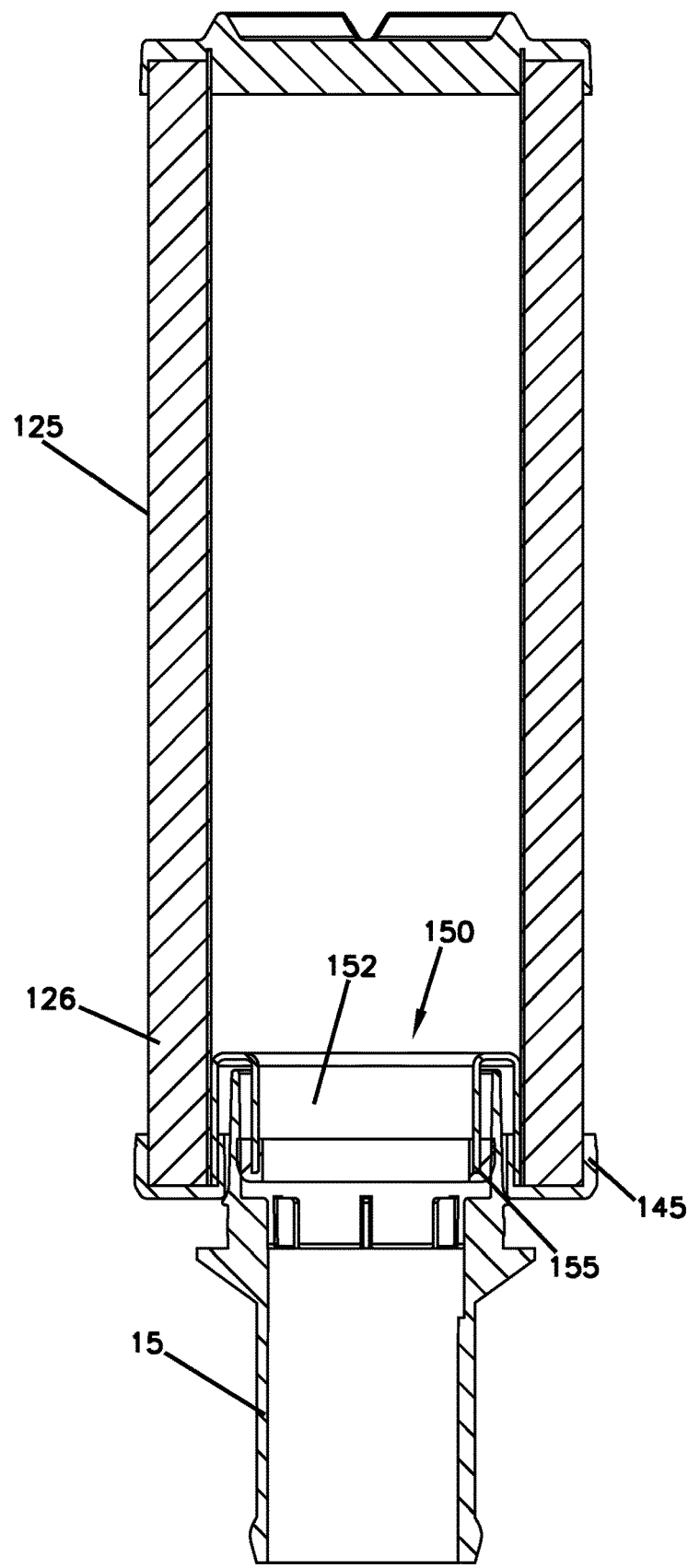
FIG. 12 is a cross-sectional view similar to FIG. 11, but with the housing assembly not being shown.
Figure 13:
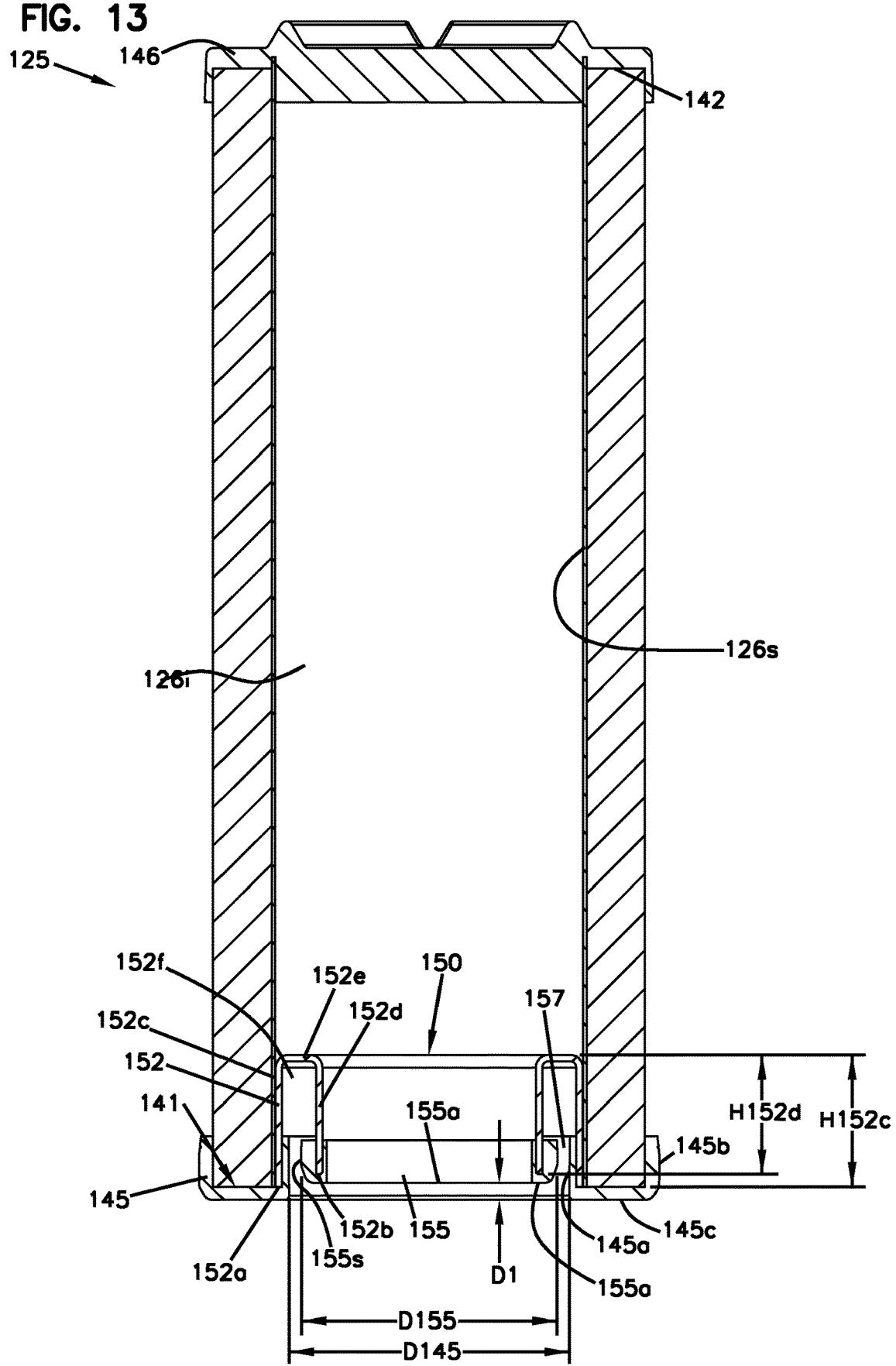
FIG. 13 is a cross-sectional view of the first filter cartridge shown in FIG. 10.
Figure 14:
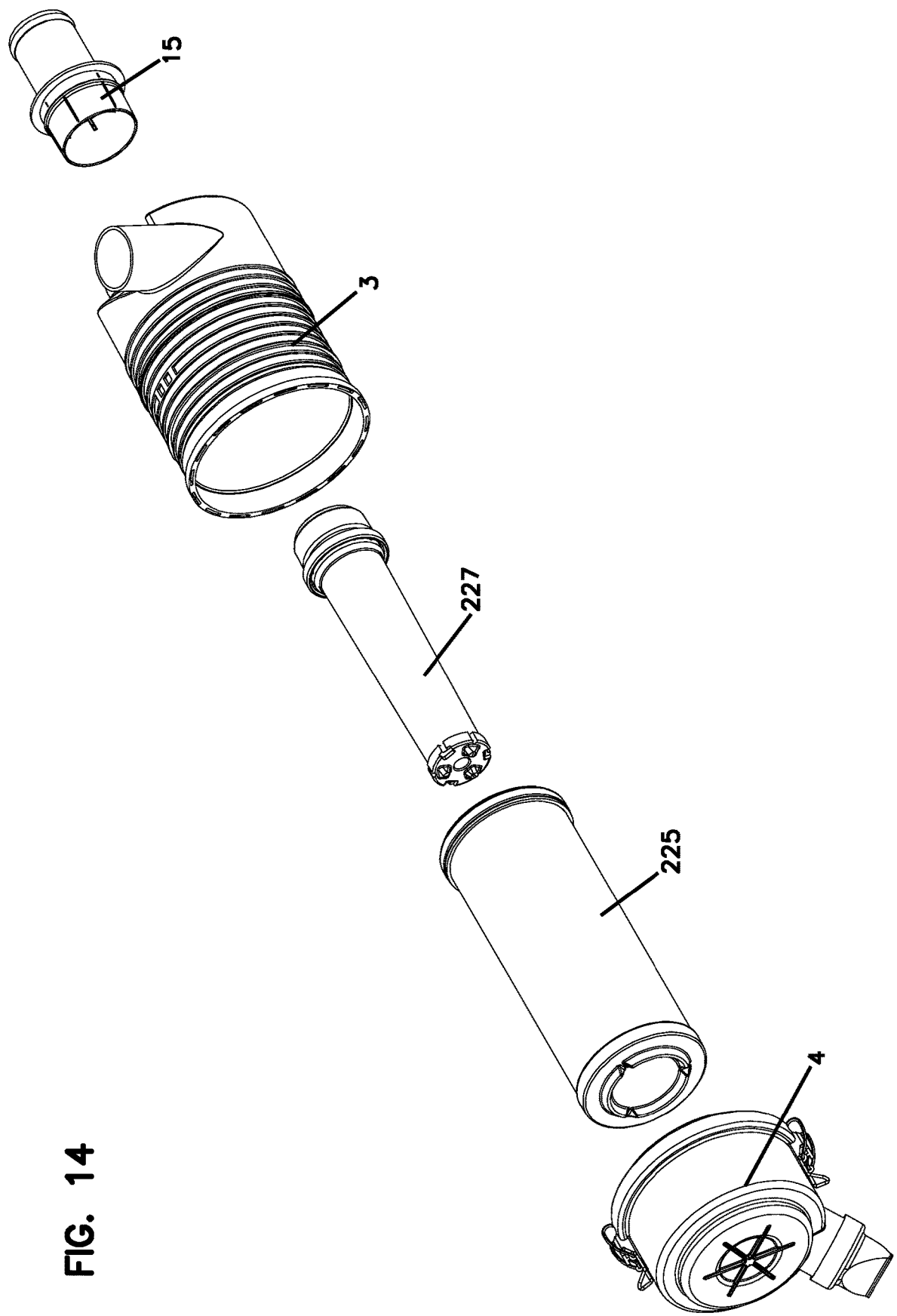
FIG. 14 is an exploded view of the air cleaner assembly shown in FIG. 1, wherein a third example of a first filter cartridge and a second example of a second filter cartridge are shown as being utilized in conjunction with the housing assembly.

Referring to FIGS. 11 to 12, the installation of the filter cartridge 125 is shown as being installed within the housing 2. As shown, the filter cartridge baffle 114 associated with the outlet tube 15 is received within the annulus 152e between the first and second segments 152c, 152d of the extension member 152. The end cap 145 can be provided with a dimension and configuration such that the inner and outer radial surfaces 145a, 145b of the end cap seal against the filter cartridge baffle 114 and housing 2, respectively. The end cap 145 can also be provided with a dimension and configuration such that no radial seal is formed with the filter cartridge baffle 114 and/or the housing 2. As the filter cartridge 125 is received into the housing 2, the seal structure 155 is received into the filter cartridge baffle 114 and the filter cartridge 125 will eventually reach its installed position in which the end face 145c of the end cap 145 is brought into contact with the housing 2. In this position, the seal surface 155s compresses against the interior surface 114b of the filter cartridge baffle 114 to form a seal. As such, a sealed airflow path between the inlet 7 and outlet tube 15 is achieved such that all air flowing out of the outlet tube 15 must first pass through the filter cartridge 125. This configuration is advantageous in instances where the housing may have been originally designed for use with a safety filter element and a main filter element that initially sealed directly against the filter cartridge baffle 114, but where the outer surface 114c of the filter cartridge baffle 114 is no longer suitable for providing a sealing surface in cases of excessive damage or wear. Accordingly, the filter cartridge 125 can be utilized to extend the useful life of a filter assembly.

IV. Filter Assembly—Third Filter Arrangement Embodiment

Referring to FIGS. 14 to 18, a third filter arrangement is shown that can be utilized with the housing 2 depicted in FIGS. 1 to 4. As many of the features for this embodiment are similar to the those previously discussed for the first and second embodiments, the description for those embodiments is incorporated into this description for the second embodiment. Where similar features do exist, similar reference numbers will be used, although in some instances a "200" series number will be used for the components of the third filter arrangement 201 (e.g. 225 for filter cartridge instead of 25 or 125). The following description will be limited to the differences of the second embodiment over the first embodiment. The third embodiment is similar to the second embodiment in that the main filter element is provided with a seal structure that is remote from the end cap and within the interior space of the media. However, the third embodiment is different from the previous embodiments in that the secondary or safety filter cartridge is provided with a sealing surface against which the sealing structure of the main filter cartridge can be sealed. With such an arrangement, the outer surface 114c of the filter cartridge baffle 114 or another part of the housing 2 is not relied upon for forming a seal with the main filter cartridge. Thus, the third embodiment is advantageous in circumstances where the outer surface 114c may be worn or damaged or where the sealing interface with the housing 2 is work, damaged, or not compatible with the main filter element end cap and seal structure. In an alternative construction, the filter cartridge 225 is provided with a shorter length such that the seal structure extends axially away from the open end cap and is not disposed within the interior space of the media.

With reference to FIGS. 14-18, it can be seen that filter cartridge 225 is similar in construction to the filter cartridge 125 in that a seal structure 255 is provided that is remote from the end cap 245 and that is within the interior area 226i of the media 226. The filter cartridge 225 is shown with pleated media 226 forming an interior area 226i and extending between a first end 241 and a second end 242, wherein an open end cap 245 is provided at the first end 241 and a closed end cap 246 is provided at the second end 242.

In contrast to the filter cartridge 125, filter cartridge 225 has a seal structure 255 having an inwardly directed radial sealing surface 255s. As mentioned previously, the remote seal structure 255 is provided such that it is spaced inwardly from the open end cap 245 and such that is disposed entirely within the interior area 126i. As shown, the seal structure 155 defines a radially inward directed sealing surface 255s at a diameter D255 that is less than an internal diameter of the end cap 245.

The seal structure 255 is supported by an extension member 252. Taken together, the end cap 245, the seal structure 255, and the interconnecting extension member 252 can be collectively referred to as a seal arrangement 250. As shown, the extension member 252 extends between a first end 252a and a second end 252b, wherein the first end 252a is embedded within or a part of the open end cap 245 and the second end is embedded in or attached to the seal structure 255. As shown, the extension member 252 includes a first segment 252c extending from the first end 152a towards the closed end cap 246 and a second segment 252d extending from the second end 252b toward the closed end cap 246 in a spaced apart, parallel relationship with the first segment 252c. The first and second segments 152c, 152d are joined by a segment 252e. In one aspect, the length H252c of the first segment 252c is greater than the length H252d of the second segment such that the end face 255a seal structure 255 is recessed from the end face 245c of the open end cap 245 by a distance D2. In such a configuration, the seal structure 255 can be characterized as being fully within the interior area 226i defined by the media 226.

The seal structure 255 can be made from a similar material as the end cap 245, such as a polyurethane material or an injection molded polymeric material. The extension member 252 can be formed from a variety of materials, for example polymeric and metal materials. In one example, the end cap 245, the extension member 252, and the seal structure 255 are integrally formed as a single component.

Figure 17:
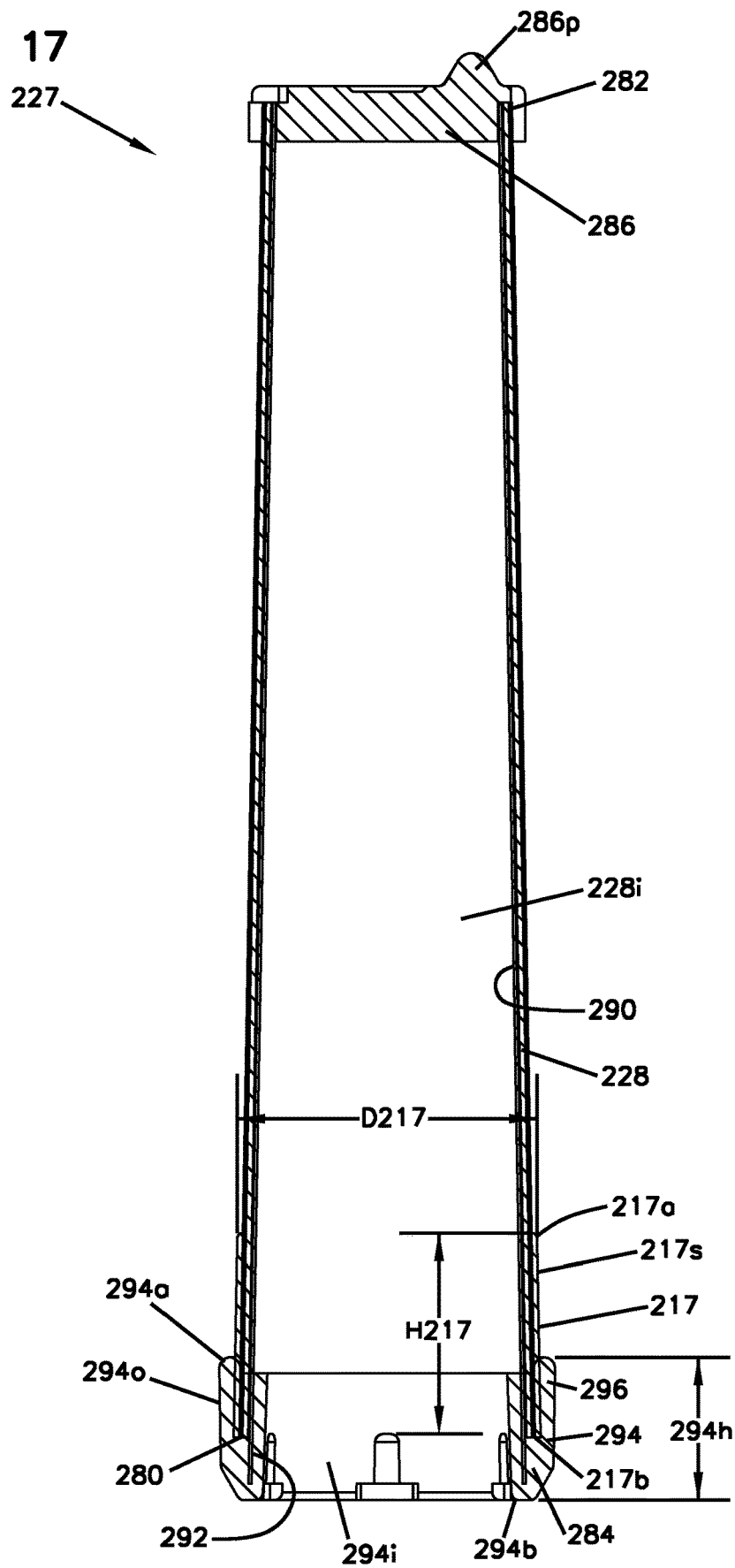
FIG. 17 is a cross-sectional view of the second filter cartridge shown in FIG. 14.
Figure 18:
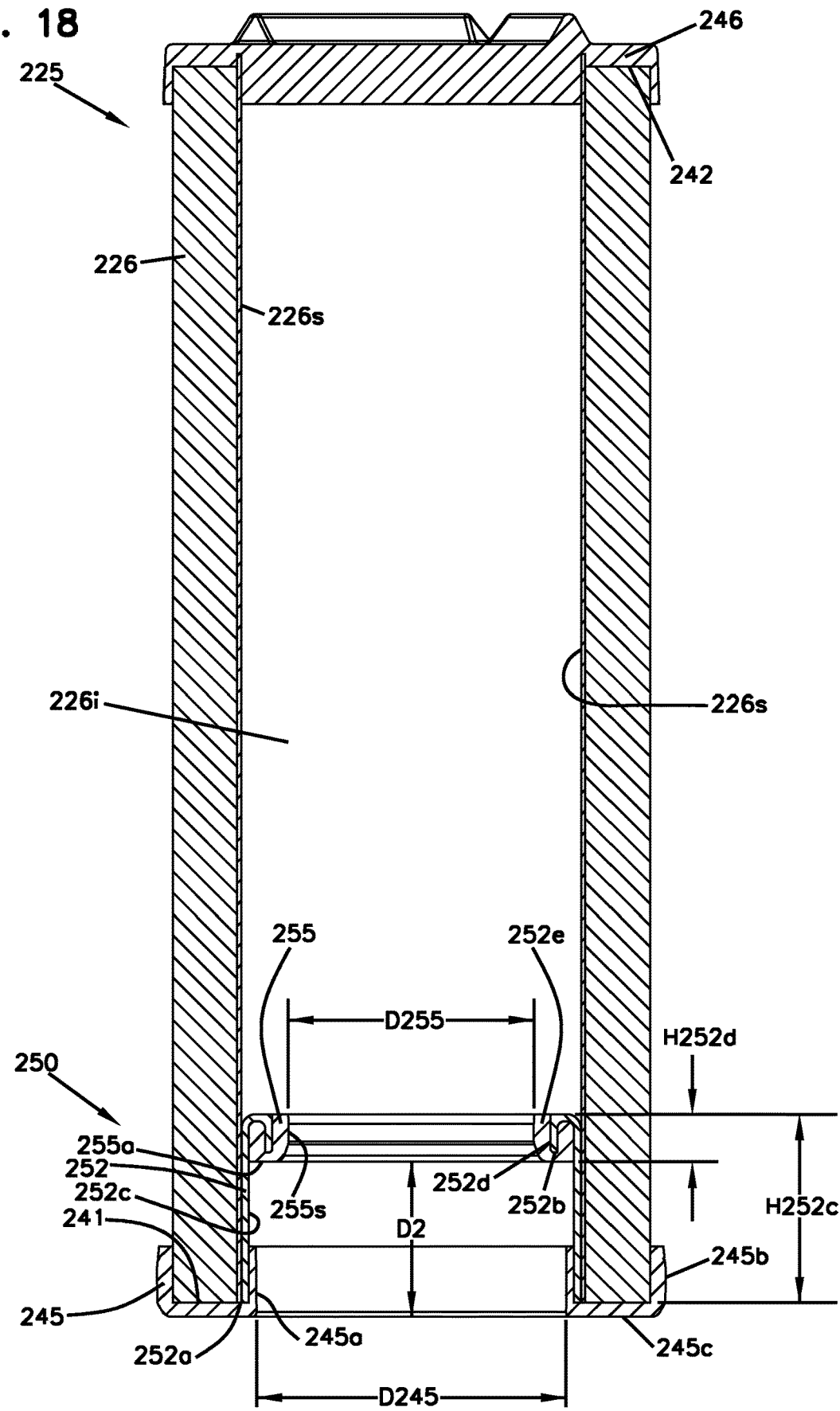
FIG. 18 is a cross-sectional view of the first filter cartridge shown in FIG. 14.

Referring to FIG. 17, the safety filter cartridge 227 is shown. The safety filter cartridge 227 is similar to filter cartridge 27 in that media 228 and support structure 290 are provided that extend between a first end 280 and a second end 282, wherein a closed end cap 286 is provided at the second end 282 and an open end cap 284 is provided at the first end 280. The first end cap 284 includes a support 292 and a secondary seal member 294 having an outwardly directed radial seal surface 296. As mentioned previously, the support 292 can be formed by the support structure 290. When molded, the secondary seal member 294 can be provided having an outer section 294o on the outside of the support 292 and having an inner section 294i on the inside of the support 292. The secondary seal member 294 can be characterized as having an axial distance or height 294h from the bottom 294b to the top 294a that is sufficient to provide a seal with the filter cartridge baffle 114.

The safety filter cartridge 227 is also provided with an annular seal surface extension member 217. As shown, the extension member 217 extends between a first end 217a and a second end 218b and has a height H217 that is greater than or equal to the height H242c of the first segment 252c of the extension member 252. However, if the second segment 252d has a sufficient length, then the height of the extension member 217 can be shorter than the first segment 252c. As shown, the first end 217a is embedded in the first end cap 284 and surrounds the filter media 290. The extension member can be impervious to gas (e.g. air) passage therethrough. The extension member 217 is provided with a continuous outer surface 217s extending between the first and second ends 217a, 217b. The continuous outer surface 217s provides a sealing surface against which the sealing surface 255s of the main filter cartridge seal structure 255 can form a seal. The extension member 217 can be formed from a polymeric material, such as ABS plastic. The extension member 217 can also be formed as an integral portion of the support structure 290. In one alternative design, the safety filter media, end cap 286, and support structure 290 are not provided, and the seal structure 284 and the extension member 217 are provided together as a removable seal surface component.

Figure 15A:
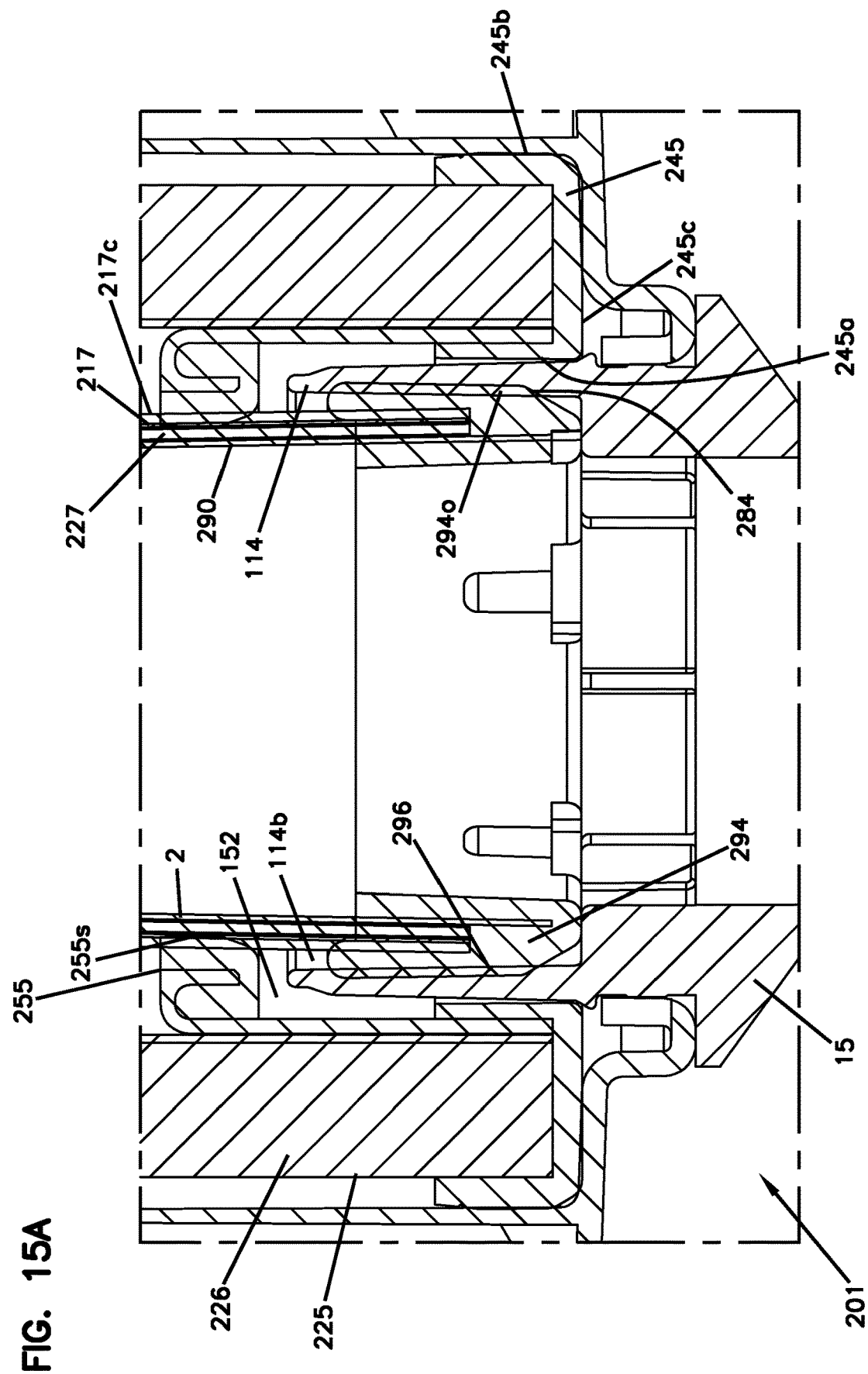
FIG. 15A is an enlarged cross-sectional view of a portion of the air cleaner assembly shown in FIG. 15, as indicated at FIG. 15.
Figure 16:
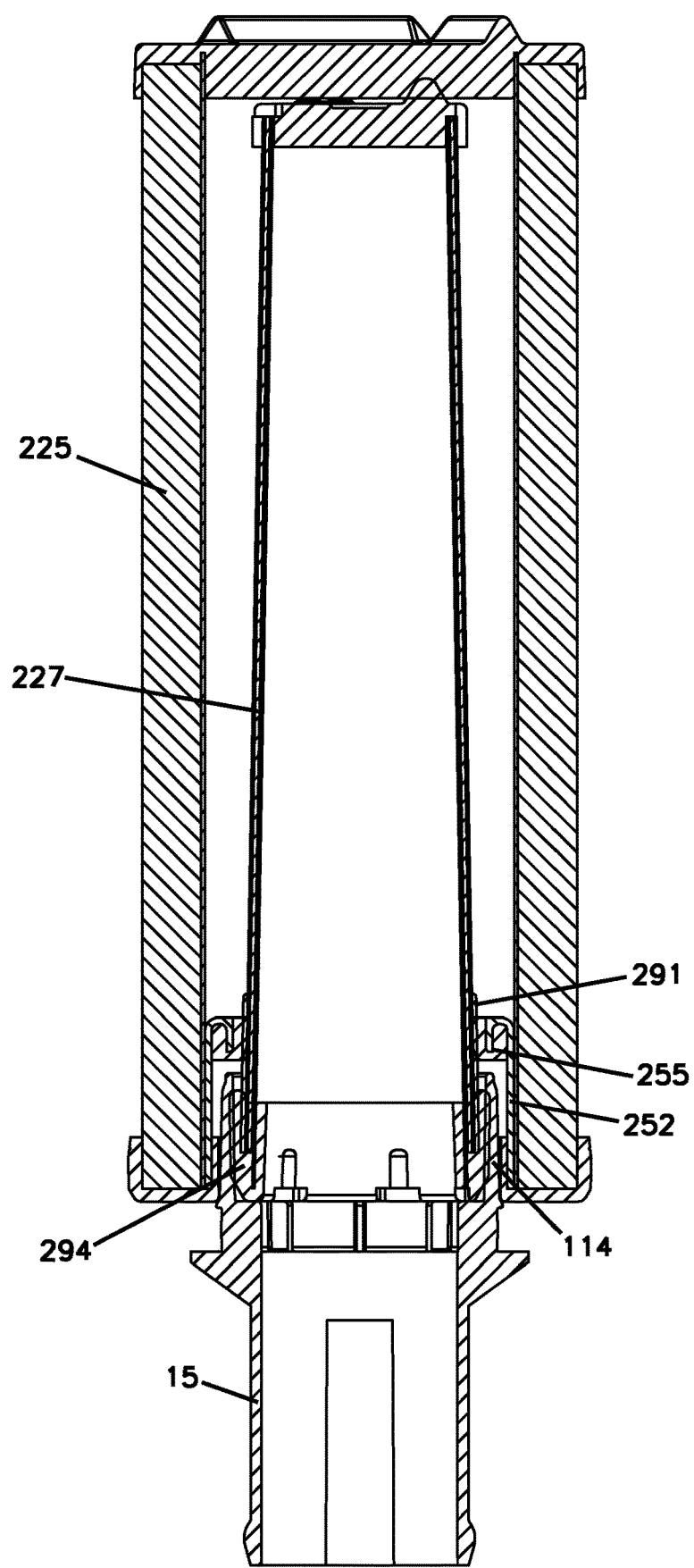
FIG. 16 is a cross-sectional view similar to FIG. 15, but with the housing assembly not being shown.

The installed filter cartridges 225, 227 can be seen at FIGS. 15 and 15A. In these figures, it can be seen that the filter cartridge 227 is installed such that the outer surface 294o of the open end cap 284 forms an outwardly directed radial seal against the inner surface 114b of the filter cartridge baffle 114. Once the safety filter cartridge 227 has been installed in this position, the main filter cartridge 225 can be installed such that the safety filter cartridge 227 is received within the interior area 226i of the main filter cartridge 225. The end cap 245 can be provided with a dimension and configuration such that the inner and/or outer radial surfaces 245a, 245b of the end cap 245 seal against the filter cartridge baffle 114 and housing 2, respectively. The end cap 245 can also be provided with a dimension and configuration such that no seal radial seal is formed with the filter cartridge baffle 114 and/or the housing 2.

As the filter cartridge 225 is received into the housing 2, the seal structure 255 will pass over the seal surface extension member 217 on the safety filter cartridge as the filter cartridge 225 eventually reaches its installed position at which point the end face 245c of the end cap 245 is brought into contact with the housing 2. Other options for axial position or constraint of the filter cartridge 225 can also be utilized. As configured the internal diameter D255 of the seal surface 255s is less than the external diameter D217 of the seal surface 217s. Accordingly, the seal structure 255 compresses against and forms an inwardly directed radial seal against the extension member outer surface 217s. Once fully installed, the safety filter cartridge 227 forms a seal with the filter cartridge baffle 114 and the main filter cartridge forms a seal with the safety filter cartridge 225, thus ensuring a clean air flow path between the inlet 7 and outlet 17 of the housing 2. This configuration is advantageous in instances where the outer surface 114c of the filter cartridge baffle is excessively worn or damaged and/or instances where a main filter cartridge 225 end cap is not compatible for sealing within the housing 2 at some other location.

V. Filter Assembly—Fourth Filter Arrangement Embodiment

Figure 19:
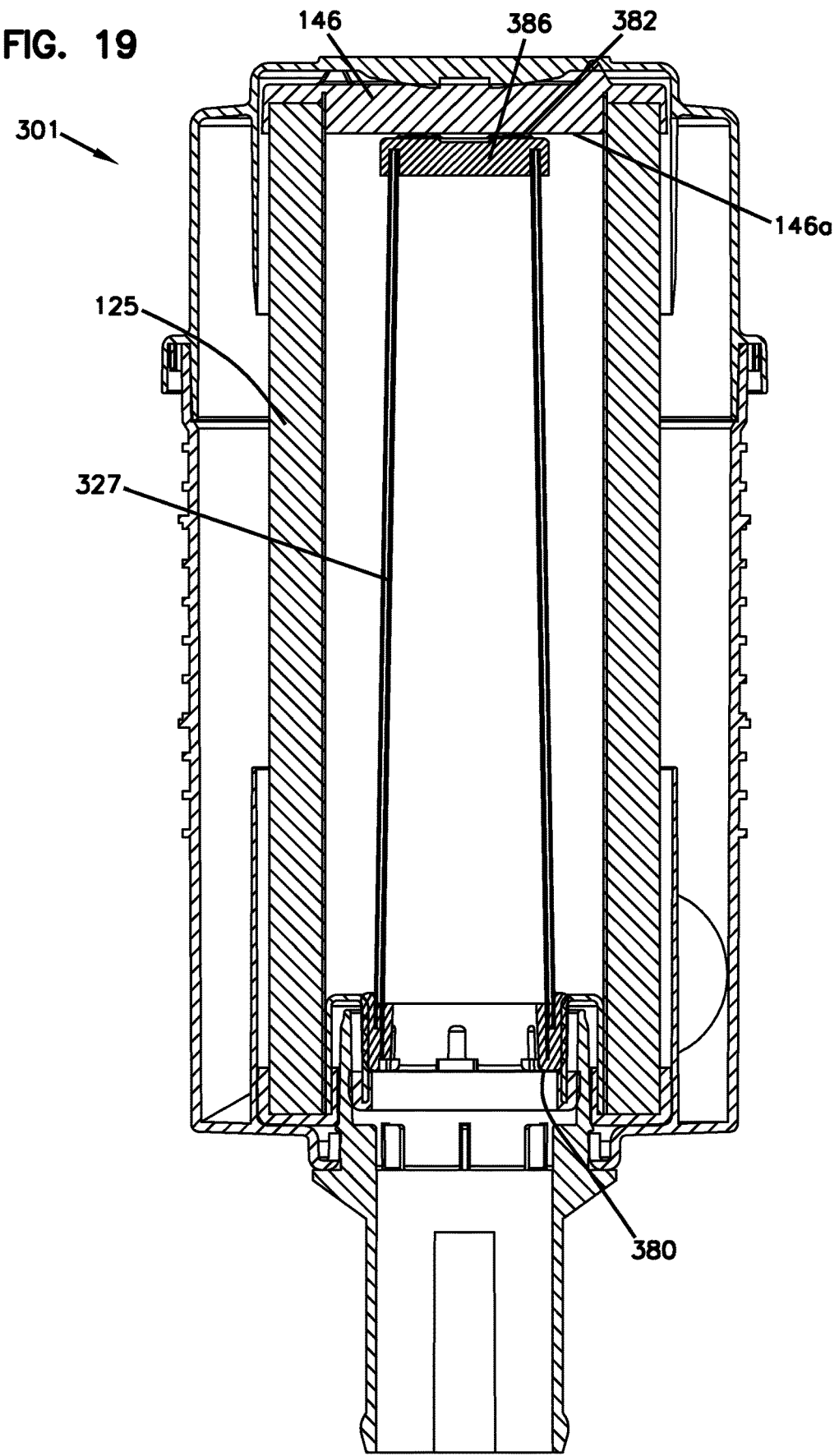
FIG. 19 is a cross-sectional view of the air cleaner assembly shown in FIG. 1, wherein the second example of a first filter cartridge and a third example of a second filter cartridge are shown.
Figure 20:
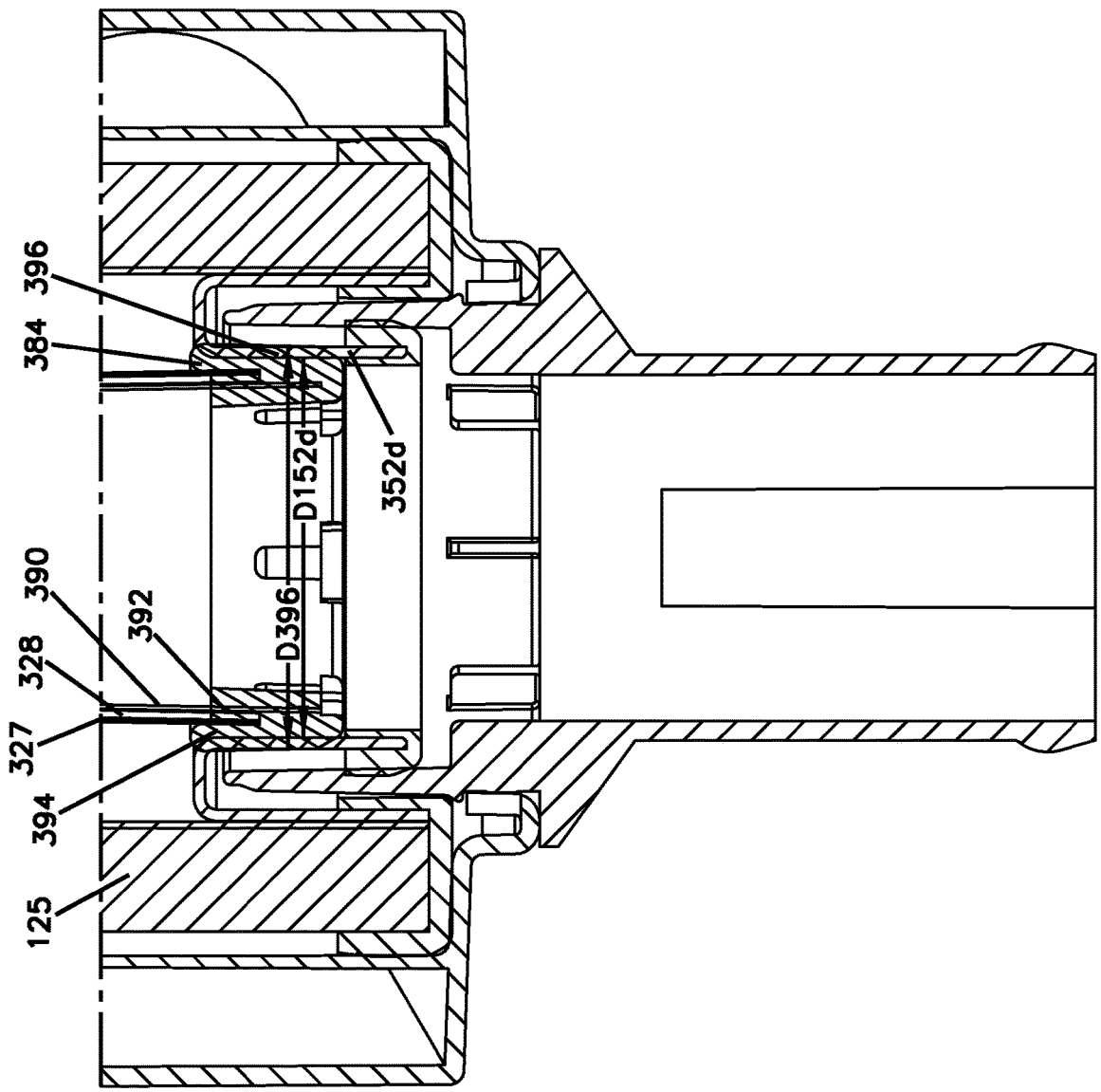
FIG. 20 is an enlarged cross-sectional view of a portion of the air cleaner assembly shown in FIG. 19.

Referring to FIGS. 19-20, a fourth filter arrangement 301 is shown that can be utilized with the housing 2 depicted in FIGS. 1 to 4. The fourth filter arrangement 301 is most similar to the second filter arrangement 101 as each utilizes the same filter cartridge 125. Accordingly, features of the filter cartridge 125 and its installation within housing 2 need not be further described here. However, in contrast to the second filter arrangement 101, the fourth filter arrangement 301 additionally includes a safety filter cartridge 327. The safety filter cartridge 327 is generally similar in design to the safety filter cartridge 27, but is sized to form a radially outwardly directed seal against the second segment 152d of the extension member 152 associated with the filter cartridge 125.

Similar to filter cartridge 27, the second filter cartridge 327 has media 328 and a support structure 390 that extend between a first end 380 and a second end 382, wherein an open end cap 384 is provided at the first end and a closed end cap 386 is provided at the second end 382. The open end cap 384 includes a seal support 392 over which a seal member 394 is disposed. Variations in construction described for filter cartridge 27 are applicable for second filter cartridge 327 and need not be discussed further here.

In one aspect, the seal member 394 of the open end cap 384 includes a radially outwardly directed seal surface 396. As can be most easily seen at FIG. 20, the seal surface 396 forms a seal against the second segment 152d of the extension member 12 associated with the filter cartridge 125. As configured, the seal member 394 is provided with an outside diameter D396 that is slightly greater than an inside diameter D152d such that a slight interference fit exists. Due to the compressibility of the seal member 394, the seal member 394 will conform to diameter D152d when the filter cartridge 327 is installed within the filter cartridge 125.

In order to install the filter cartridges 125, 327 within the housing 2, the filter cartridge 125 is first installed into the interior space 126i of the filter cartridge 327. This is accomplished by coaxially aligning the filter cartridges 125, 327 and then inserting the closed end cap 386 of the filter cartridge 327 through the opening defined by the remote seal structure 155 extending from the open end cap 145 of the filter cartridge 125. Insertion in this direction continues until the closed end cap 386 of the filter cartridge 327 is brought into contact with the interior surface 146s of the closed end cap 146 of the filter cartridge 125. At this installation location, the overall length of the filter cartridge 327 is such that the seal surface 396 is axially aligned with the second segment 152d of the extension member 152 of the filter cartridge 152. Other alignment methods for ensuring that the seal surface 394 is axially aligned with the second segment 152 can be also be used. For example, the extension member 152, or another part of the filter cartridge 125, can include a stop member against which a portion (e.g. the seal member 394) of the filter cartridge 327 engages. Once the filter cartridge 327 has been installed within the filter cartridge 125, the cartridges can then be installed together within the housing 2. Insertion of the combined filter cartridge assembly 125, 327 is performed such that the seal surface 155s of the remote seal structure 155 associated with the filter cartridge 125 is sealed against the filter cartridge baffle 114 of the housing 2, as previously described in relation to the filter cartridge 125 in Section III above.

VI. Filter Assembly—Fifth Filter Arrangement Embodiment

Figure 21:
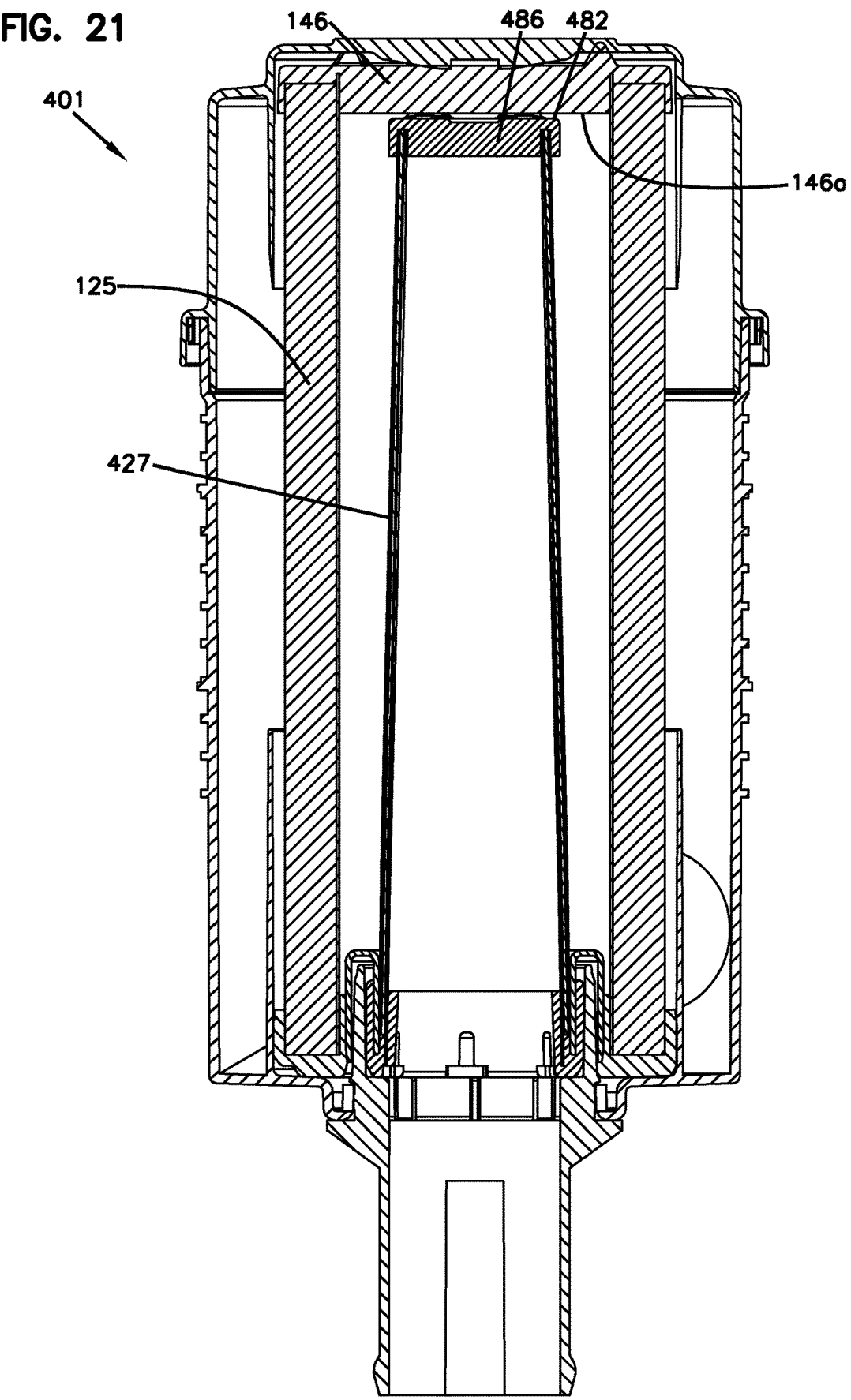
FIG. 21 is a cross-sectional view of the air cleaner assembly shown in FIG. 1, wherein the first example of a first filter cartridge and a fourth example of a second filter cartridge are shown.
Figure 22:
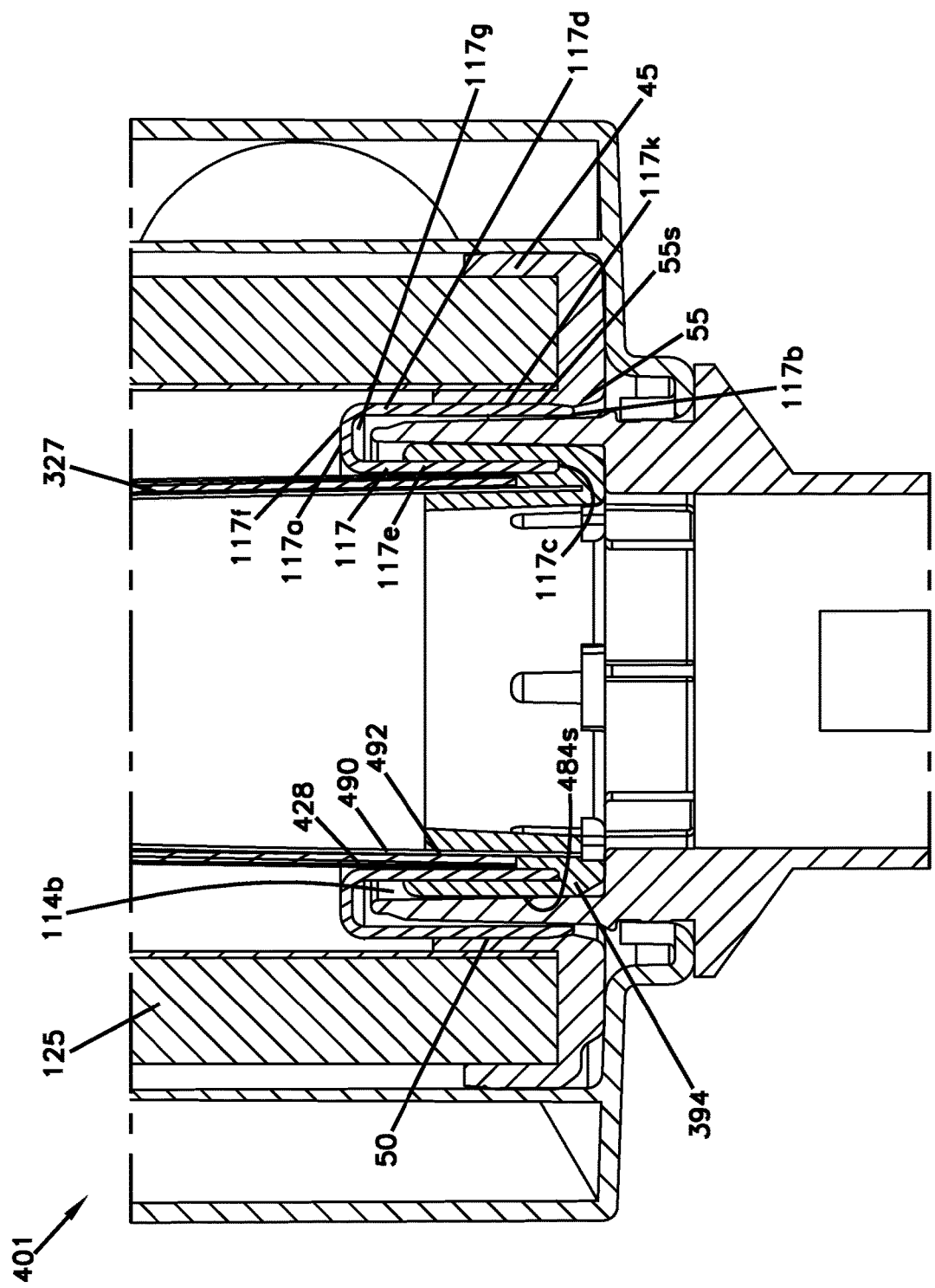
FIG. 22 is an enlarged cross-sectional view of a portion of the air cleaner assembly shown in FIG. 21.

Referring to FIGS. 21-22, a fifth filter arrangement 401 is shown that can be utilized with the housing 2 depicted in FIGS. 1 to 4. The fourth filter arrangement 301 is most similar to the first filter arrangement 1 as each utilizes the same filter cartridge 25. Accordingly, features of the filter cartridge 25 and its installation within housing 2 need not be further described here. However, in contrast to the first filter arrangement 1, the fifth filter arrangement 401 combines the safety filter cartridge 27 and a modified version of the seal surface component 17 into a single assembly 427.

Similar to filter cartridge 27, the filter cartridge 427 has media 428 and a support structure 490 that extend between a first end 480 and a second end 482, wherein an open end cap 484 is provided at the first end and a closed end cap 486 is provided at the second end 482. The open end cap 484 includes a seal support 492 over which a seal member 494 is disposed. Variations in construction described for filter cartridge 27 are applicable for second filter cartridge 427 and need not be discussed further here.

In one aspect, the open end cap 484 additionally includes a seal surface component 117 having a main body 117a (e.g., ring or annular-shaped) extending from a first end 117b to a second end 117c. Between the first end 117b and the second end 117c, the main body 117a includes a first extension segment 117d and a generally parallel second extension segment 117e joined by a connecting portion 117f. The first and second extension segments 117d, 117e are spaced apart such that an annulus 117g is formed therebetween. As shown, the second extension segment 117e is adjacent the media 128 and/or support structure 190 and is embedded within the material forming the seal support 492. In one aspect, the first extension part 117d defines an outer sealing surface 117k. In one example, the seal surface component 117 is formed from a material that has a greater hardness than the material used to form the seal surface component 117. In one example, the seal surface component 117 and the open end cap 484 are formed from a similar material. In one example, the seal surface component 117 and the open end cap 484 are unitarily formed (e.g. via molding) as a single component. In one example, the seal surface component 117 is formed in an independent molding process. In one example, open end cap 484 is simultaneously molded onto the support structure 90, the media 428, and the seal surface component 117.

When the filter cartridge 427 is installed into the housing 2, the filter cartridge baffle 114 of the housing 2 is received into the annulus 117g formed between the first and second extension parts 117d, 117e until the end of the open end cap 484 bottoms out against a surface of the housing 2. Once the filter cartridge 427 is fully inserted, a seal surface 484s of the open end cap 484 seals against the inner surface 114b of the filter cartridge baffle 114. After filter cartridge 427 is installed, the filter cartridge 25 can be inserted into the housing 2 in the same manner as previously described in Section II above. Upon insertion, the seal surface 55s associated with the open end cap 45 of filter cartridge 25 seals against the outer sealing surface 117k of the seal surface component 117.

VII. Filtration Media and Terminology

The particular material chosen for the media is a matter of choice for a selected application. When the filter assembly is an air cleaner, any of a variety of media materials now used in air cleaners can be used with principles according to the present disclosure.

The media pack can comprise only media 26, 126, 226 or the media can be provided with an inner and/or outer liner before installation in the cartridge 25, 125, 225. The media can be pleated, nonpleated, depth media, or wave media although additional alternatives are possible. The media can be provided in a variety of configurations including cylindrical and conical, and with a variety of inner and/or outer perimeter definitions, for example circular or oval. Additionally, fluted filter media (media having media ridges) can be used to provide fluid filter constructions in a variety of manners. One well known manner is characterized herein as a z-filter construction. The term "z-filter construction" as used herein, is meant to include (but not be limited) a type of filter construction in which individual ones of corrugated, folded or otherwise formed filter flutes are used to define (typically in combination with facing media) sets of longitudinal, typically parallel, inlet and outlet filter flutes for fluid flow through the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these cited references being incorporated herein by reference.

It is noted that although the seal of the arrangements are sometimes characterized as "radial." However, as a result of the non-circular shape, some of the sealing forces will be directed other than specifically at or away from the central axis X of the cartridge. The seals are nevertheless characterized herein as "radial," since, in general, the seal surfaces on the cartridge and housing are generally radially directed and the sealing forces are either radially outwardly directed or radially inwardly directed, around the axis X, depending on whether an outwardly or inwardly directed seal surface is involved. Alternately stated, the compression forces are still not axial (i.e. in the longitudinal direction of axis X), but rather are generally radial. There are applications, however, where the seal forces are not aligned directly toward or away from the axis X in each of these non-circular configurations.

In more general terms, radial seals comprise seal surfaces that surrounds (directed toward away from) a central axis. That central axis in many instances will comprise a central axis of a filter cartridge around which media is also positioned. However, from alternative arrangements described herein below, it will be understood that a radial seal can be a seal that surrounds an axis that is not also a central axis for the cartridge (by contrast, an axial seal is a seal that is generally aligned with a central axis around which the seal is positioned, typically also, but not necessarily in all instances, a central cartridge axis X).

In the general terminology used herein, the various housing seal arrangements depicted can also be characterized as generally comprising a radially directed seal surface, since the seal direction for the various housing seals depicted in the drawings, is generally with a surface of the seal engaging some portion of the housing (be it a portion of an outlet tube or outer portion of the housing, depending on whether which of the two of the housing seals is involved) that can be generally characterized as a "radially directed surface." In each instance, the surface that actually forms the seal is directed around (and facing toward or away from) a central axis X (typically, also of the cartridge)as opposed to an axial seal which would be generally with seal forces directed in the longitudinal direction of the central axis X. The examples depicted are "radial" seals or "radially" directed seals meaning that the surface of the seal member on the cartridge that will form a seal in engagement with a housing or replaceable sealing surface, is directed either towards or away from a central axis of the cartridge, as opposed to being orthogonal to the axis. In some examples shown, the seals are "outward" radial seal surfaces or "outwardly" directed radial seals since the actual surface of the seal member on the cartridge that will form a seal is generally directed away from a central axis of the cartridge, as opposed as to toward the axis. In some examples shown, the seals are "inward" radial seal surfaces or "inwardly directed" radial seals since the actual surface of the seal member on the cartridge that will form a seal that is generally directed towards a central axis of the cartridge, as opposed to away from the axis. However, many of the principles described herein can be applied in alternate arrangements in which the seal surface on the cartridge that engages the housing to form a seal is directed radially toward the central axis.

The radial housing seals described herein can be generally characterized as "non-clamp," "non-clamping" or "clampless" arrangements or by similar terms. By this it is meant that the seal arrangements typically do not involve the use of a clamp such as a hose clamp or other structure that needs to be tightened in order to provide for a secure seal. Rather, the seals are established by mere installation, with compression of the seal material against a surface of the housing being directed by a cartridge component.

The principles described herein can be applied in a variety of filter assemblies. Examples described in which the principles applied to (air) gas filter assemblies. Examples are described include gas/air filters and crankcase ventilation filter assemblies. The principles can be applied to a variety of alternate gas filtration arrangements, in some instances even with liquid filter assemblies.

Principles according to the present disclosure relate to interactions between filter cartridges and air cleaner systems, in advantageous manners to achieve certain, selected, desired results discussed below. The filter cartridge would generally include a filter media therein, through which air and other gases pass, during a filtering operation. The media can be of a variety of types and configurations, and can be made from using a variety of materials. For example, pleated media arrangements can be used in cartridges according to the principles of the present disclosure, as discussed below.

In this section, examples of some media arrangements that are usable with the techniques described herein are provided. It will be understood, however, that a variety of alternate media types can be used. The choice of media type is generally one of preference for: availability; function in a given situation of application, ease of manufacturability, etc. and the choice is not necessarily specifically related to the overall function of selected ones of various filter cartridge/air cleaner interaction features characterized herein.

What is claimed:
1. A filter cartridge comprising:
   a. filtration media defining an interior area and extending between a first end and a second end;
   b. an open end cap coupled to the filtration media at the first end, the open end cap having an end and defining an inwardly directed radial surface; and c. a seal structure including a seal member attached to the open end cap by an extension member, the seal member defining an end and an outwardly directed radial sealing surface, wherein the seal structure is located at least partially within the filtration media interior area and being located such that the outwardly directed radial sealing surface is spaced radially inward from the open end cap inwardly directed radial surface such that an annulus fully separates the seal member outwardly directed radial sealing surface from the open end cap inwardly directed radial surface.

2. The filter cartridge of claim 1, wherein the seal structure is formed from the same material as the open end cap.

3. The filter cartridge of claim 1, wherein the seal structure, extension member, and open end cap are integrally formed as a singular component.

4. The filter cartridge of claim 1, further including a support frame located within the interior area, the support frame being configured to support the filtration media.

5. The filter cartridge of claim 1, wherein the seal structure is formed from a polyurethane material.

6. The filter cartridge of claim 4, wherein the seal structure extends from the support frame.

* * * * *

UNITED STATES PATENT AND TRADEMARK OFFICE
CERTIFICATE OF CORRECTION

| | | |
|---|---|---|
| PATENT NO. | : 11,554,338 B2 | Page 1 of 1 |
| APPLICATION NO. | : 16/465874 | |
| DATED | : January 17, 2023 | |
| INVENTOR(S) | : Daniel E. Adamek | |

It is certified that error appears in the above-identified patent and that said Letters Patent is hereby corrected as shown below:

On the Title Page

(72) Inventors: "Woluwe Saint-Pierre (BE)" should read --Woluwe-Saint-Pierre (BE)--

In the Specification

Column 11, Line 29: "difference is that that the second" should read --difference is that the second--

Signed and Sealed this
Eighth Day of July, 2025

Coke Morgan Stewart
*Acting Director of the United States Patent and Trademark Office*